United States Patent
Bussa

(10) Patent No.: US 12,072,794 B1
(45) Date of Patent: Aug. 27, 2024

(54) TESTING A METAVERSE APPLICATION FOR RENDERING ERRORS ACROSS MULTIPLE DEVICES

(71) Applicant: Bank of America Corporation, Charlotte, NC (US)

(72) Inventor: Swathi Bussa, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 45 days.

(21) Appl. No.: 18/169,805

(22) Filed: Feb. 15, 2023

(51) Int. Cl.
  *G06F 11/00* (2006.01)
  *G06F 11/07* (2006.01)
  *G06F 11/36* (2006.01)
  *G06T 7/00* (2017.01)

(52) U.S. Cl.
  CPC ...... *G06F 11/3692* (2013.01); *G06F 11/0712* (2013.01); *G06F 11/0751* (2013.01); *G06F 11/0793* (2013.01); *G06F 11/3688* (2013.01); *G06T 7/0002* (2013.01); *G06T 2207/10016* (2013.01)

(58) Field of Classification Search
  CPC ............ G06F 11/3692; G06F 11/0712; G06F 11/0751; G06F 11/0793; G06F 11/3688
  USPC ........................................................ 714/1–57
  See application file for complete search history.

(56) References Cited

U.S. PATENT DOCUMENTS

| | | | |
|---|---|---|---|
| 7,509,539 B1 * | 3/2009 | Denefleh | G06F 11/079 714/48 |
| 8,082,297 B2 | 12/2011 | Syvain et al. | |
| 8,631,417 B1 | 1/2014 | Mendes Da Costa et al. | |
| 9,165,426 B2 | 10/2015 | Jones et al. | |
| 9,342,211 B2 | 5/2016 | DeLuca et al. | |
| 10,326,667 B2 | 6/2019 | Jones et al. | |
| 10,587,584 B2 | 3/2020 | Vikramaratne et al. | |
| 10,610,787 B2 | 4/2020 | Hamilton et al. | |
| 10,931,650 B1 | 2/2021 | McCown et al. | |
| 10,981,069 B2 | 4/2021 | Kawachiya et al. | |
| 11,170,003 B2 | 11/2021 | Wu et al. | |
| 2006/0190770 A1 * | 8/2006 | Harding | G06F 11/3612 714/38.11 |
| 2007/0254631 A1 | 11/2007 | Spooner | |
| 2010/0250383 A1 | 9/2010 | Frazier et al. | |
| 2011/0072367 A1 | 3/2011 | Bauer | |
| 2014/0026078 A1 | 1/2014 | Dawson et al. | |
| 2018/0104595 A1 | 4/2018 | Kawachiya et al. | |
| 2018/0123816 A1 | 5/2018 | Tandon et al. | |
| 2019/0050134 A1 * | 2/2019 | Grossman | G06F 3/04847 |

(Continued)

*Primary Examiner* — Sarai E Butler

(57) ABSTRACT

A system includes a memory and a processor coupled to the memory. The processor runs a software application on a simulated user device to render a virtual environment on the simulated user device. The processor detects that a first view of the virtual environment has been rendered and accesses from the memory a first expected view pattern that corresponds to the first view. The processor compares the first view to the first expected view pattern and detects that a pattern of one or more visual elements in the first view does not match with an expected pattern of visual elements in the first expected view pattern. In response, the processor determines that an error has occurred relating to rendering the virtual environment by the software application. The processor obtains a solution corresponding to the error and applies the solution to the software application to resolve the detected error.

20 Claims, 5 Drawing Sheets

(56) References Cited

U.S. PATENT DOCUMENTS

2020/0338458 A1  10/2020  Huang et al.
2021/0016174 A1* 1/2021  Yang ..................... A63F 13/69
2021/0042748 A1  2/2021  Sepulveda et al.
2021/0268389 A1  9/2021  Kawachiya et al.
2022/0248955 A1  8/2022  Tran

* cited by examiner

TESTING A METAVERSE APPLICATION FOR RENDERING ERRORS ACROSS MULTIPLE DEVICES

TECHNICAL FIELD

The present disclosure relates generally to data processing, and more specifically to testing a metaverse application for rendering errors across multiple 5 devices.

BACKGROUND

Often a single software application designed to render a virtual environment (e.g., metaverse environment) on a user device is designed to be compatible with several types of user devices (e.g., smart phone, smart watch, VR headset, VR gloves, augmented reality (AR) glasses, wrist-based bands etc.). The software application is typically tested on each compatible user device to check whether the virtual environment is rendered properly and that the virtual content included in the virtual environment is perceivable, operable, comprehensible and robust across all compatible user devices. Presently, testing a software application for rendering errors includes visually inspecting the virtual environment as rendered on a particular user device to detect and identify the errors. This makes the testing process labor intensive, time consuming and prone to human errors, especially when the software application is to be tested for a plurality of user devices. Further, no system presently exists that can intelligently resolve a detected error without human intervention.

SUMMARY

The system and methods implemented by the system as disclosed in the present disclosure provide technical solutions to the technical problems discussed above by intelligently testing a software application for errors in rendering a virtual environment (e.g., metaverse environment) on a user device intelligently and efficiently. The disclosed system and methods provide several practical applications and technical advantages.

For example, the disclosed system and methods provide the practical application of detecting and resolving rendering errors associated with rendering a virtual environment by a software application on a user device. A rendering manager runs a software application on a simulated user device to render the virtual environment on the simulated user device wherein the simulated user device is a computer simulation of a real-world user device configured to run the software application. In response to detecting that a first view of the virtual environment has been rendered by the software application on the simulated user device, the rendering manager accesses from a memory a first expected view pattern of a plurality of expected view patterns stored in the memory, wherein the first expected view pattern corresponds to the first view. Each expected view pattern relates to a view of the virtual environment and comprises an expected pattern of one or more visual elements included in the view. The rendering manager compares the first view of the virtual environment to the first expected view pattern. In response to detecting that a pattern of one or more visual elements in the first view does not match with an expected pattern of visual elements in the first expected view pattern, rendering manager determines that an error has occurred relating to the generation of the first view of the virtual environment by the software application on the simulated user device. The rendering manager obtains a known solution corresponding to the detected error and applies the known solution to the software application to resolve the detected error.

By detecting and resolving rendering errors associated with rendering the virtual environment intelligently and efficiently, the disclosed system and method improve the speed of testing the software application on a user device and avoids human errors. Further, by accurately detecting and resolving errors during the testing phase, the disclosed system and method save processing resources that would otherwise be used on a real-world user device to resolve rendering errors that may occur while running the software application on the real-world user device. Additionally, detecting and resolving rendering errors at the testing phase avoids rendering errors from occurring when the software application is deployed and run on a real-world user devices, thus improving processing performance of the real-world user devices. This generally improves the technology associated with virtual world environments such as metaverse environments.

The disclosed system and method provide an additional practical application of detecting and resolving rendering errors associated with rendering a video clip configured to play in a virtual environment rendered by a software application on a simulated user device. A rendering manager runs the software application on the simulated user device to render the virtual environment on the simulated user device wherein the simulated user device is a computer simulation of a real-world user device configured to run the software application. The rendering manager detects that the software application has rendered a video clip for playing in the virtual environment and converts the video clip into metadata associated with the video clip, wherein the metadata comprises information relating to video and audio elements on one or more frames of the video clip. The rendering manager compares a first metadata associated with a first frame of the video clip with a second metadata associated with at least one second frame of the video clip before or after the first frame. In response to determining that the first frame of the video clip and the at least one second frame of the video clip do not conform to a pre-configured transition associated with the first frame and the at least one second frame, the rendering manager determines that an error has occurred in relation to rendering the video clip in the virtual environment on the simulated user device. The rendering manager obtains a known solution corresponding to the detected error and applies the known solution to the software application to resolve the detected error.

By detecting and resolving rendering errors associated with rendering the video clip in the rendered virtual environment intelligently and efficiently, the disclosed system and method improve the speed of testing the software application on a user device and avoids human errors. Further, by accurately detecting and resolving errors during the testing phase, the disclosed system and method save processing resources that would otherwise be used on a real-world user device to resolve rendering errors that may occur while running the software application on the real-world user device. For example, if the video clip is stuck while playing in the virtual environment, processing resources may be expended to replay the video clip within the virtual environment. Additionally, detecting and resolving rendering errors at the testing phase avoids rendering errors from occurring when the software application is deployed and run on a real-world user devices, thus improving processing performance of the real-world user devices.

This generally improves the technology associated with virtual world environments such as metaverse environments.

The disclosed system and method provide an additional practical application of detecting and resolving rendering errors associated with rendering a virtual environment by a software application on a simulated user device. A rendering manager runs the software application on the simulated user device to render the virtual environment on the simulated user device wherein the simulated user device is a computer simulation of a real-world user device configured to run the software application. In response to detecting an error associated with generation of the virtual environment by the software application on the simulated user device, the rendering manager searches a list of solutions based on the detected error, wherein each solution in the list of solutions corresponds to a known error associated with generation of the virtual environment on the real-world user device. Based on the search, the rendering manager obtains a solution corresponding to the detected error, wherein the solution comprises a revised source code or instructions to revise a source code of the software application to resolve the respective error. The rendering manager determines a portion of the source code of the software application that relates to the detected error and revises the portion of the source code in accordance with the revised source code or instructions to revise the source code specified in the solution.

By resolving rendering errors associated with rendering the virtual environment intelligently and efficiently, the disclosed system and method improve the speed of testing the software application on a user device and avoids human errors. Further, by accurately detecting and resolving errors during the testing phase, the disclosed system and method save processing resources that would otherwise be used on a real-world user device to resolve rendering errors that may occur while running the software application on the real-world user device. Additionally, detecting and resolving rendering errors at the testing phase avoids rendering errors from occurring when the software application is deployed and run on a real-world user devices, thus improving processing performance of the real-world user devices. This generally improves the technology associated with virtual world environments such as metaverse environments.

Testing the software application on simulated user devices as opposed to real-world user devices eliminates the need for obtaining real-world user devices for the testing. For example, rendering manager may store a plurality of simulated user devices in a memory and access one or more simulated user devices from the memory as and when needed to test the software application. This allows testing the software application for several user devices simultaneously and significantly increases the speed of testing the software application across several user devices. An additional technical advantage of testing the software application on simulated user devices includes saving computing resources (e.g., processing, memory and networking resources) that would otherwise need to be expended on each real-world user device while testing the real-world user device.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Example System

Figure 1:
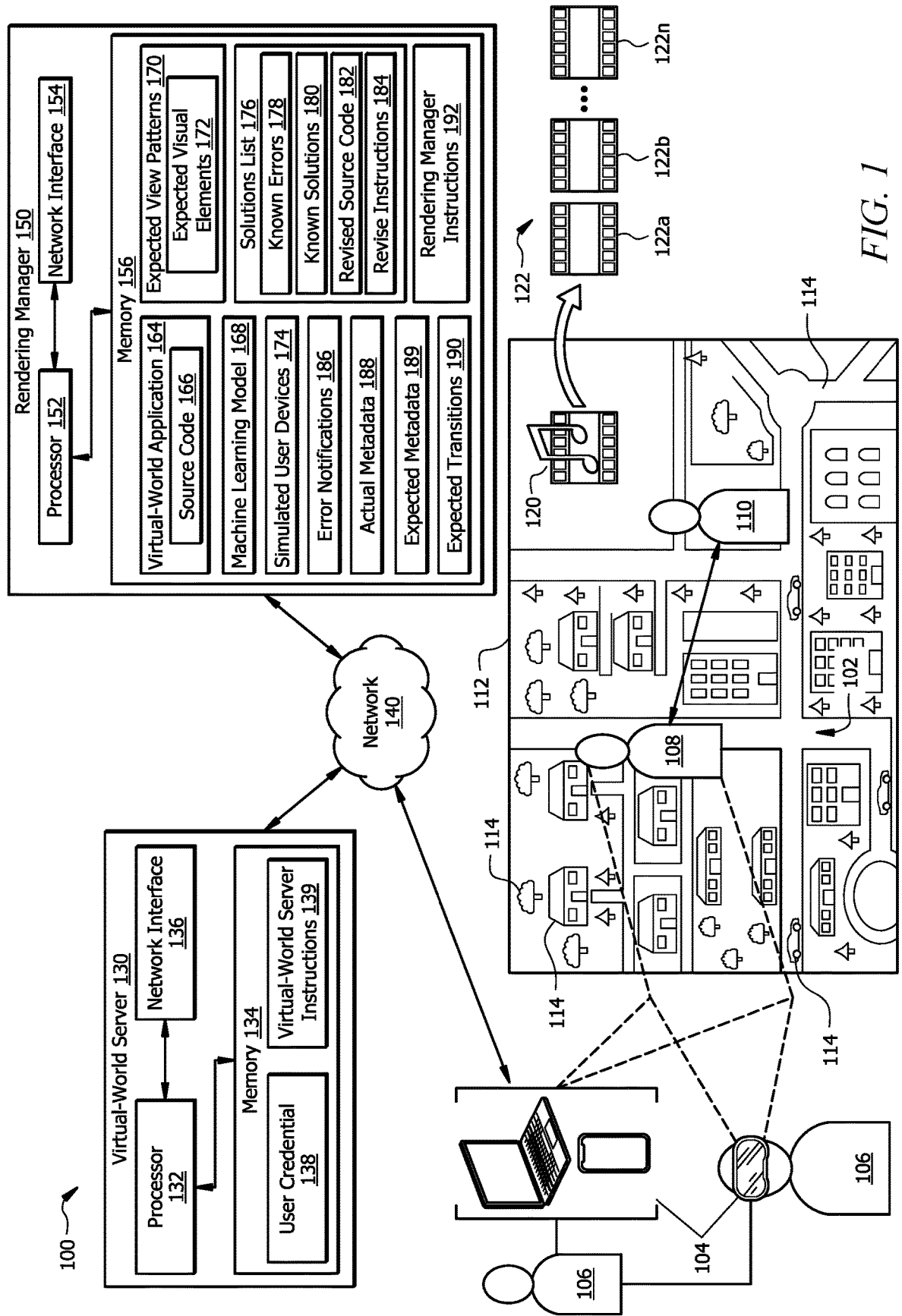
FIG. 1 is a schematic diagram of a system, in accordance with certain aspects of the present disclosure.

FIG. 1 is a schematic diagram of a system 100, in accordance with certain aspects of the present disclosure. System 100 may include a plurality of user devices 104, a virtual-world server 130 and a rendering manager 150, each connected to a network 140. A user 106 may be associated with each user device 104. The system 100 may be communicatively coupled to the communication network 140 and may be operable to transmit data between each one of the user devices 104, virtual-world server 130 and rendering manager 150 through the communication network 140.

Each user device 104 may be configured to run a virtual-world application 164 (e.g., metaverse application) that generates (e.g., renders) a virtual environment 102 (e.g., metaverse environment) on the user device 104. The virtual-world application 164 is a software application with a source code 166 which when run by a user device 104 generates the virtual environment 102 on the user device 104. A user 106 may access the virtual environment 102 (e.g., a metaverse environment) through the user device 104. The user device 104 is configured to display a two-dimensional (2D) or three-dimensional (3D) representation of the virtual environment 102 to the user 106. Examples of a virtual environment 102 may include, but are not limited to, a graphical or virtual representation of a metaverse, a map, a building interior, a landscape, a fictional location, an alternate reality, or any other suitable type of location or environment. The virtual environment 102 may be configured to use realistic or non-realistic physics for the motion of objects within the virtual environment 102. For example, some virtual environments 102 may be configured to use gravity whereas other virtual environments 102 be configured not to use gravity. Within the virtual environment 102, each user 106 may be associated with an avatar (such as avatars 108 and 110). An avatar is a graphical representation of a user at a virtual location within the virtual environment 102. In embodiments, the virtual location of the avatar may be correlated to the physical location of a user 106 in the real-world environment. Examples of an avatar may include, but are not limited to, a person, an animal, or an object. In some embodiments, the features and characteristics of the avatar may be customizable and user-defined. For example, the size, shape, color, attire, accessories, or any other suitable type of appearance features may be specified by a user. By using an avatar, a user 106 is able to move within the virtual environment 102 to interact with one or more avatars and objects within the virtual environment 102 while independently remaining at a physical location in the real-world environment or being in transit in the real-world environment.

While engaging in the virtual environment 102 via an avatar 108/110, a user 106 may interact with a plurality of other users 106, objects and/or entities through a respective avatar 108/110. For example, a first user 106 may attempt to engage in an interaction session with a second avatar 110 associated with a second user 106, through a first avatar 108 associated with the first user 106. In the real-world environment, the second user 106 may be physically located at a distance away from the first user 106. The first user 106 may access the virtual environment 102 through a first user device 104 and the second user 106 may access the virtual environment 102 through a second user device 104. The second user 106 may access the virtual environment 102 through the second user device 104 of the second user 106 to control the second avatar 110 and attempt to engage in an interaction session with the first user 106 through the first avatar 108.

Before a user 106 is able to access the virtual environment 102 and engage in data interactions (e.g., via avatar 108/110) within the virtual environment 102, a virtual-world server 130 may authenticate that the avatar 108/110 is associated with the user 106 and not an unauthorized third-party. For example, the user 106 may be required to sign into a secure portal by providing a pre-registered user credential 138 (e.g., username, password, biometrics etc.). In one or more embodiments, the virtual-world server 130 may employ single sign-on (SSO), multifactor authentication, or any other suitable authentication scheme in order to allow the user 106 access to the virtual environment 102. The virtual-world server 130 may store other information related to the user 106 including, but not limited to, user profile information, avatar information, or any other suitable type of information that is associated with a user 106 within the virtual environment 102 and/or the real-world environment.

It may be noted that the terms "real-world" and "real-world environment" in this disclosure refer to any non-virtual environment where users 106 can physically interact with real persons and objects. A real-world data interaction may refer to any data interaction performed outside the virtual environment 102 (e.g., a metaverse environment). Further, it may be noted that while certain embodiments of the present disclosure may be described in the context of a metaverse environment which is an example of a virtual environment 102, the methods discussed in this disclosure apply to any other virtual environment 102. The terms "virtual environment" and "metaverse environment" are used interchangeably throughout this disclosure. Also, the terms "virtual-world" and "metaverse" may be used interchangeably. Additionally, the terms "user device 104" and "real-world user devices" may be used interchangeably. Furthermore, it may be noted that while certain embodiments of this disclosure may describe one or more operations in relation to a single user 106, these embodiments apply to any other user 106 connected to the network 140 via a respective user device 104.

As discussed in more detail below, rendering manager 150 may be configured to test a virtual-world application 164 for compatibility with one or more real-world user devices 104. As shown in FIG. 1, rendering manager 150 comprises a processor 152, a memory 156, and a network interface 154. The processor 152 comprises one or more processors operably coupled to the memory 156. The processor 152 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 152 may be a programmable logic device, a microcontroller, a microprocessor, or any suitable combination of the preceding. The processor 152 is communicatively coupled to and in signal communication with the memory 156. The one or more processors are configured to process data and may be implemented in hardware or software. For example, the processor 152 may be 8-bit, 16-bit, 32-bit, 64-bit or of any other suitable architecture. The processor 152 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions (e.g., rendering manager instructions 192) to implement the rendering manager 150. In this way, processor 152 may be a special-purpose computer designed to implement the functions disclosed herein. In one or more embodiments, the rendering manager 150 is implemented using logic units, FPGAs, ASICs, DSPs, or any other suitable hardware. The rendering manager 150 is configured to operate as described with reference to FIGS. 1 and 3-5. For example, the processor 152 may be configured to perform at least a portion of the methods 300, 400 and 500 as described in FIGS. 3, 4 and 5 respectively.

The memory 156 comprises one or more disks, tape drives, or solid-state drives, and may be used as an over-flow data storage device, to store programs when such programs are selected for execution, and to store instructions and data that are read during program execution. The memory 156 may be volatile or non-volatile and may comprise a read-only memory (ROM), random-access memory (RAM), ternary content-addressable memory (TCAM), dynamic random-access memory (DRAM), and static random-access memory (SRAM).

The memory 156 is operable to store the virtual-world application (including source code 166), a machine learning model 168, simulated user devices 174, actual metadata 188, expected transitions 190, expected view patterns 170 including expected visual elements 172, solutions list 176 including known errors 178, known solutions 180, revised source code 182 and/or revise instructions 184, error notifications 186 and rendering manager instructions 192. The rendering manager instructions 192 may include any suitable set of instructions, logic, rules, or code operable to execute the rendering manager 150.

The network interface 154 is configured to enable wired and/or wireless communications. The network interface 154 is configured to communicate data between the rendering manager 150 and other devices, systems, or domains (e.g. user devices 104, virtual-world server 130). For example, the network interface 154 may comprise a Wi-Fi interface, a LAN interface, a WAN interface, a modem, a switch, or a router. The processor 152 is configured to send and receive data using the network interface 154. The network interface 154 may be configured to use any suitable type of communication protocol as would be appreciated by one of ordinary skill in the art.

It may be noted that the virtual-world server 130 may be implemented similar to the rendering manager 150. For example, as shown in FIG. 1, the virtual-world server 130 includes a processor 132, a memory 134 and a network interface 136. The memory is configured to store user credential 138 and virtual-world server instructions 139. The processor 132 may be configured to process the virtual-world server instructions 139 to implement the functionality of the virtual-world server 130 described herein.

Each of the virtual-world server 130 and the rendering manager 150 is generally a suitable server (e.g., including a physical server and/or virtual server) operable to store data in a memory (e.g., respective memories 134 and 156) and/or provide access to application(s) or other services. One or both of the virtual-world server 130 and the rendering manager 150 may be a backend server associated with a particular entity (e.g., organization) that facilitates conducting interactions between entities and one or more users. In other embodiments, one or both of the virtual-world server 130 and the rendering manager 150 may be organized in a distributed manner, or by leveraging cloud computing technologies. Virtual-world server 130 may store information which is primarily used to support data interactions performed in the virtual environment 102 (e.g., metaverse environment). It may be noted that the operations performed by the virtual-world server 130 and the rendering manager 150 described in embodiments of the present disclosure may be implemented by a single server.

The communication network 140 may facilitate communication within the system 100. This disclosure contemplates the communication network 140 being any suitable network operable to facilitate communication between the user devices 104, virtual-world server 130 and the rendering manager 150. Communication network 140 may include any interconnecting system capable of transmitting audio, video, signals, data, messages, or any combination of the preceding. Communication network 140 may include all or a portion of a local area network (LAN), a wide area network (WAN), an overlay network, a software-defined network (SDN), a virtual private network (VPN), a packet data network (e.g., the Internet), a mobile telephone network (e.g., cellular networks, such as 4G or 5G), a Plain Old Telephone (POT) network, a wireless data network (e.g., WiFi, WiGig, WiMax, etc.), a Long Term Evolution (LTE) network, a Universal Mobile Telecommunications System (UMTS) network, a peer-to-peer (P2P) network, a Bluetooth network, a Near Field Communication network, a Zigbee network, and/or any other suitable network, operable to facilitate communication between the components of system 100. In other embodiments, system 100 may not have all of these components and/or may have other elements instead of, or in addition to, those above.

Each of the user devices 104 may be any computing device configured to communicate with other devices, such as a server (e.g., virtual-world server 130 and/or rendering manager 150), databases, etc. through the communication network 140. Each of the user devices 104 may be configured to perform specific functions described herein and interact with one or both of virtual-world server 130 and the rendering manager 150, e.g., via respective user interfaces. Each of the user devices 104 is a hardware device that is generally configured to provide hardware and software resources to a user 106. Examples of a user device 104 include, but are not limited to, a virtual reality (VR) device, an augmented reality device, a laptop, a computer, a smartphone, a tablet, a smart device, an Internet-of-Things (IoT) device, or any other suitable type of device. The user devices 104 may comprise a graphical user interface (e.g., a display), a touchscreen, a touchpad, keys, buttons, a mouse, or any other suitable type of hardware that allows a user to view data and/or to provide inputs into the user device. Each user device may be configured to allow a user 106 to send requests to one or both of virtual-world server 130 and the rendering manager 150, or to another user device.

Example User Device

Figure 2:
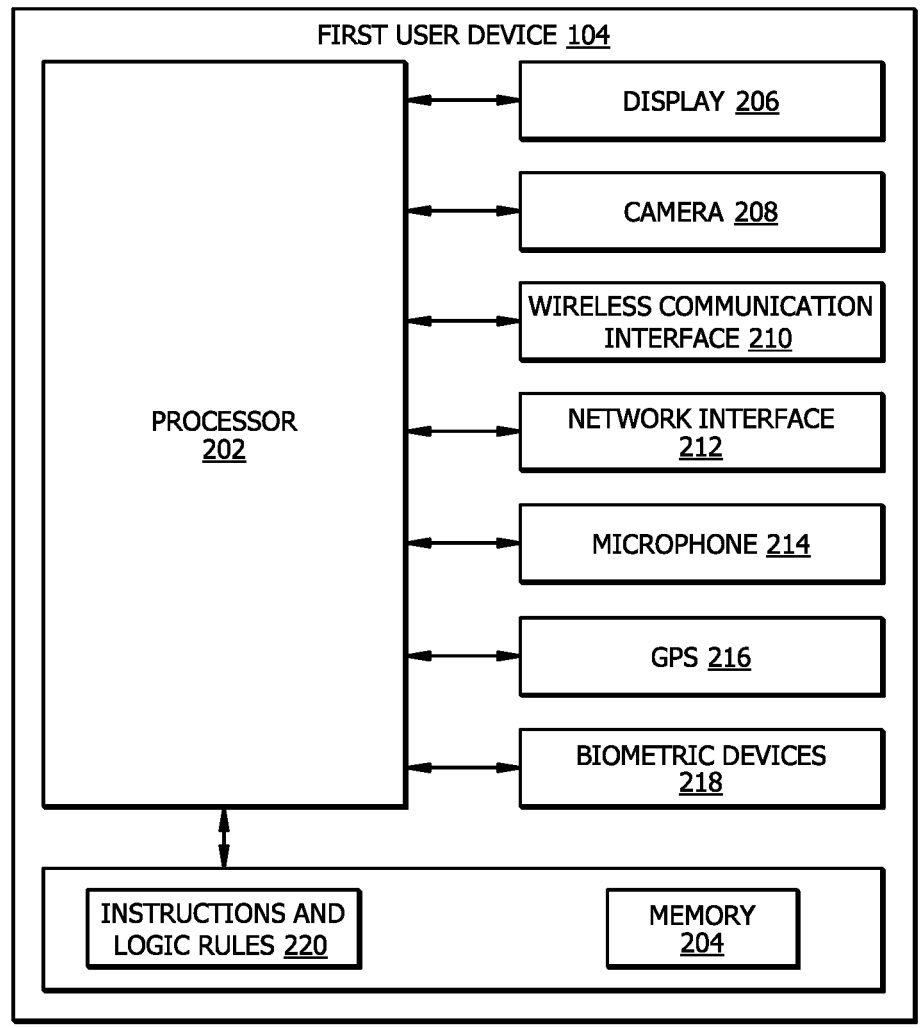
FIG. 2 is a block diagram of an embodiment of a user device used by the system of FIG. 1.

FIG. 2 is a block diagram of an embodiment of a user device 104 used by the system of FIG. 1. User device 104 may be configured to display the virtual environment 102 (referring to FIG. 1) within a field of view of a user 106 (referring to FIG. 1), capture biometric, sensory, and/or physical information of the user 106 wearing the user device 104, and to facilitate an electronic interaction between the user 106 and another user 106 (referring to FIG. 1) or between the user 106 and an entity (e.g., a virtual entity in the virtual environment 102).

User device 104 comprises a processor 202, a memory 204, and a display 206. Further embodiments may include a camera 208, a wireless communication interface 210, a network interface 212, a microphone 214, a global position system (GPS) sensor 216, and/or one or more biometric devices 218. User device 104 may be configured as shown or in any other suitable configuration. For example, user device 104 may comprise one or more additional components and/or one or more shown components may be omitted.

The processor 202 comprises one or more processors operably coupled to and in signal communication with memory 204, display 206, camera 208, wireless communication interface 210, network interface 212, microphone 214, GPS sensor 216, and biometric devices 218. Processor 202 is configured to receive and transmit electrical signals among one or more of memory 204, display 206, camera 208, wireless communication interface 210, network interface 212, microphone 214, GPS sensor 216, and biometric devices 218. The electrical signals are used to send and receive data (e.g., images captured from camera 208, virtual objects to display on display 206, etc.) and/or to control or communicate with other devices. Processor 202 may be operably coupled to one or more other devices (for example, the virtual-world server 130 and/or rendering manager 150 shown in FIG. 1).

The processor 202 is any electronic circuitry including, but not limited to, state machines, one or more central processing unit (CPU) chips, logic units, cores (e.g., a multi-core processor), field-programmable gate array (FPGAs), application specific integrated circuits (ASICs), or digital signal processors (DSPs). The processor 202 may be a programmable logic device, a microcontroller, a microprocessor, or any suitable combination of the preceding. The one or more processors are configured to process data and may be implemented in hardware or software. For example, the processor 202 may be 8-bit, 16-bit, 32-bit, 64-bit or of any other suitable architecture. The processor 202 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions to implement the function disclosed herein, such as some or all of those described with respect to FIGS. 1 and 3-5. For example, processor 202 may be configured to display virtual objects on display 206, detect hand gestures, identify virtual objects selected by a detected hand gesture, capture biometric information of a user 106, via one or more of camera 208, microphone 214, and/or biometric devices 218, and communicate via wireless communication interface 210 with the virtual-world server 130, rendering manager 150 and/or another user device 104. In some embodiments, the function described herein is implemented using logic units, FPGAs, ASICs, DSPs, or any other suitable hardware or electronic circuitry.

The memory 204 is operable to store any of the information described with respect to FIGS. 1 and 3-5 along with any other data, instructions, logic, rules, or code operable to implement the function(s) described herein when executed by processor 202. For example, the memory 204 may store the instructions 220. The memory 204 comprises one or more disks, tape drives, or solid-state drives, and may be used as an over-flow data storage device, to store programs when such programs are selected for execution, and to store instructions and data that are read during program execution. Memory 204 is operable to store, for example, information relating to the identity of the user, instructions for performing the functions of user device 104 described herein, and any other data or instructions. The memory 204 may be volatile or non-volatile and may comprise read-only memory (ROM), random-access memory (RAM), ternary content-addressable memory (TCAM), dynamic random-access memory (DRAM), and static random-access memory (SRAM).

Display 206 is configured to present visual information to a user 106 in a virtual reality environment, an augmented reality environment or mixed reality environment. In other embodiments, the display 206 is configured to present visual information to the user 106 as the virtual environment 102 (referring to FIG. 1) in real-time. In an embodiment, display 206 is a wearable optical display (e.g., glasses or a headset) configured to reflect projected images and enables a user to see through the display. For example, display 206 may comprise display units, lens, semi-transparent mirrors embedded in an eye glass structure, a visor structure, or a helmet structure. Examples of display units include, but are not limited to, a cathode ray tube (CRT) display, a liquid crystal display (LCD), a liquid crystal on silicon (LCOS) display, a light emitting diode (LED) display, an active-matrix OLED (AMOLED), an organic LED (OLED) display, a projector display, or any other suitable type of display as would be appreciated by one of ordinary skill in the art upon viewing this disclosure. In another embodiment, display 206 is a graphical display on a user device. For example, the graphical display may be the display of a tablet or smart phone configured to display virtual environment 102.

Examples of camera 208 include, but are not limited to, charge-coupled device (CCD) cameras and complementary metal-oxide semiconductor (CMOS) cameras. Camera 208 is configured to capture images of a wearer of user device 104, such as user 106. Camera 208 may be configured to capture images continuously, at predetermined intervals, or on-demand. For example, camera 208 may be configured to receive a command from user 106 to capture an image. In another example, camera 208 is configured to continuously capture images to form a video stream. Camera 208 is communicably coupled to processor 202.

Examples of wireless communication interface 210 include, but are not limited to, a Bluetooth interface, an RFID interface, a near field communication interface, a local area network (LAN) interface, a personal area network interface, a wide area network (WAN) interface, a Wi-Fi interface, a ZigBee interface, or any other suitable wireless communication interface as would be appreciated by one of ordinary skill in the art upon viewing this disclosure. Wireless communication interface 210 is configured to facilitate processor 202 in communicating with other devices. For example, wireless communication interface 210 is configured to enable processor 202 to send and receive signals with other devices, such as another user device 104, the virtual-world server 130 and/or rendering manager 150 (referring to FIG. 1). Wireless communication interface 210 is configured to employ any suitable communication protocol.

The network interface 212 is configured to enable wired and/or wireless communications. The network interface 212 is configured to communicate data between the user device 104 and other network devices, systems, or domain(s). For example, the network interface 212 may comprise a WIFI interface, a local area network (LAN) interface, a wide area network (WAN) interface, a modem, a switch, or a router. The processor 202 is configured to send and receive data using the network interface 212. The network interface 212 may be configured to use any suitable type of communication protocol as would be appreciated by one of ordinary skill in the art.

Microphone 214 is configured to capture audio signals (e.g., voice signals or commands) from a user 106. Microphone 214 is configured to capture audio signals continuously, at predetermined intervals, or on-demand. Microphone 214 is communicably coupled to processor 202.

GPS sensor 216 is configured to capture and to provide geographical location information. For example, GPS sensor 216 is configured to provide a geographic location of a user 106, employing user device 104. GPS sensor 216 may be configured to provide the geographic location information as a relative geographic location or an absolute geographic location. GPS sensor 216 may provide the geographic location information using geographic coordinates (i.e., longitude and latitude) or any other suitable coordinate system. GPS sensor 216 is communicably coupled to processor 202.

Examples of biometric devices 218 may include, but are not limited to, retina scanners, fingerprint scanners and facial scanners. Biometric devices 218 are configured to capture information about a person's physical characteristics and to output a biometric signal based on captured information. A biometric signal is a signal that is uniquely linked to a person based on their physical characteristics. For example, biometric device 218 may be configured to perform a retinal scan of the user's eye and to generate a biometric signal for the user based on the retinal scan. As another example, a biometric device 218 is configured to perform a fingerprint scan of the user's finger and to generate a biometric signal for the user based on the fingerprint scan. Biometric device 218 is communicably coupled to processor 202.

Referring back to FIG. 1, as noted above, each user device 104 may be configured to run a virtual-world application 164 (e.g., metaverse application) that generates (e.g., renders) the virtual environment 102 on the user device 104. Often a single virtual-world application 164 (e.g., a particular version of the virtual-world application) may be designed to be compatible with several types of user devices 104 (e.g., smart phone, smart watch, VR headset, VR gloves, augmented reality (AR) glasses, wrist-based bands etc.). For example, a single virtual-world application 164 may be designed to be compatible with a smart phone and a VR headset. In this example, a source code 166 of the virtual-world application 164 is written in a manner that the virtual-world application 164 is compatible with smart phones as well as VR headsets. This means that the same virtual-world application 164 may be used to render the virtual environment 102 on smart phones as well as VR headsets. Before being deployed on compatible user devices 104, the virtual-world application 164 is typically tested on each compatible user device 104 to check whether the virtual environment 102 is rendered properly and that the virtual content included in the virtual environment 102 is perceivable, operable, comprehensible and robust across all compatible user devices 104.

Testing the virtual-world application 164 in relation to a compatible device 104 generally includes detecting and fixing errors associated with rendering the virtual environment 102 on the compatible user device 104. The rendering errors may include but are not limited to, improperly rendered visual elements 114, misaligned visual elements 114, erroneous layout of one or more visual elements 114, partially loaded visual elements 114 and unloaded visual elements 114. However, a single virtual-world application 164 may be designed to be compatible with several types of user devices 104, several models of a particular type of user device 104, and several operating systems supported by a particular type of user device 104. Presently, the only way to test the virtual-world application 164 for rendering errors is to visually inspect the virtual environment 102 as rendered on a particular user device 104. This makes the testing process tedious, time consuming and prone to human errors. Further, no system presently exists that can intelligently resolve a detected error without human intervention.

Embodiments of the present disclosure describe techniques to test compatibility of a virtual-world application 164 or a version thereof across a plurality of user devices 104. The disclosed techniques include detecting and resolving errors associated with generating (e.g., rendering) a virtual environment 102 by the virtual-world application 164 on one or more real-world user devices 104.

Detecting and Identifying Errors in Rendering a Virtual Environment

Rendering manager 150 may be configured to detect and identify visual errors associated with generating/rendering the virtual environment 102 or portions thereof by the virtual-world application 164 on a particular user device 104. These visual rendering errors may include but are not limited to, improperly rendered visual elements 114, misaligned visual elements 114, erroneous layout of one or more visual elements 114, partially loaded visual elements 114, and unloaded visual elements 114. As described in more detail below, to detect and identify errors in rendering the virtual environment 102 on a particular user device 104, the rendering manager 150 compares each view 112 of the virtual environment 102 rendered by the virtual-world application 164 on the particular user device 104 with a corresponding expected view pattern 170. The rendering manager 150 determines that an error has occurred in relation to rendering the view 112 when the view 112 does not match with the corresponding expected view pattern 170.

A view 112 of the virtual environment 102 refers to a snapshot of the virtual environment 102 as rendered by the virtual-world application 164 on a user device 104. The virtual environment 102 may be viewed as a collection of a plurality of such views 112. A virtual environment 102 may include hundreds or even thousands of distinct views 112 depending on the complexity of the virtual environment 102. As shown in FIG. 1, a particular view 112 of the virtual environment 102 includes a unique pattern of visual elements 114 including, but not limited to, buildings, trees, cars, roads, avatars, devices, objects, media clips 120 and any other visual element that can be rendered and shown as part of the virtual environment 102. A pattern of visual elements 114 associated with a particular view 112 of the virtual environment 102 represents a unique arrangement of the visual elements 114 included in the particular view 112.

Rendering manager 150 is configured to store a plurality of expected view patterns 170, wherein each expected view pattern 170 corresponds to a particular view 112 of the virtual environment 102 that can be rendered by the virtual-world application 164 and includes an expected pattern of expected visual elements 172 in a corresponding view 112 of the virtual environment 102. In other words, an expected view pattern 170 stores a snapshot of a corresponding view 112 of the virtual environment 102 and includes a pattern of visual elements 114 that is expected to be displayed on a user device 104 if the corresponding view 112 is rendered without errors by the virtual-world application on the user device 104. In one embodiment, rendering manager 150 stores an expected view pattern 170 corresponding to each view 112 that can be rendered by the virtual-world application 164.

Rendering manager 150 may be configured to use a machine learning model 168 to detect and identify rendering errors associated with rendering the virtual environment 102 on a user device 104. In one embodiment, the machine learning model 168 may use deep convolutional neural networks (DCNN) to detect the rendering errors associated with the virtual environment 102 efficiently and accurately. Rendering manager 150 may be configured to train the machine learning model 168 based on the expected view patterns 170 to detect and identify visual errors associated with rendering the virtual environment 102 on a user device 104. Once trained, the machine learning model 168 may detect and identify rendering errors associated with virtual environment 102 on the user device 104.

In certain embodiments, it may not be practical to test the virtual-world application 164 on a plurality of real-world user devices 104, especially when the virtual-world application 164 is designed to be compatible with a large number of types of user devices 104. For example, to test the virtual-world application 164 on a particular type of real-world user device 104, one of the user devices 104 of the particular type may need to be physically obtained and connected to the rendering manager (e.g., directly or remotely). Further, new versions of user devices 104 are regularly introduced (e.g., new versions of smart phones may be introduced yearly) and newer versions of the virtual-world application 164 that are designed to be compatible with the newer user devices 104 need to be tested before deployment on the newer user devices 104. Additionally, newer versions of the virtual-world application 164 are often released (e.g., with upgrades and/or bug fixes) which may need to be tested on all compatible user devices 104. Thus, it may be impractical and cost prohibitive to obtain physical user devices 104 for testing. Further, time delays may be associated with obtaining a physical user device 104.

Rendering manager 150 may be configured to test the virtual-world application 164 on simulated user devices 174, wherein a simulated user device 174 is a computer simulation of a real-world user device 104 that is configured to run the virtual-world application 164. In one embodiment, rendering manager 150 may be configured to store a plurality of simulated user devices 174 in memory 156. Rendering manager 150 may be configured to access a particular simulated user device 174 from the memory 156 as and when needed to test the virtual-world application 164. In an additional or alternative embodiment, rendering manager 150 may be configured to dynamically generate a simulated user device 174 corresponding to a real-world user device 104 (e.g., a new user device 104 or a new version thereof) as and when needed. Rendering manager may be configured to store a generated simulated user device 174 in the memory 156 for future use in testing the virtual-world application 164 (e.g., newer versions of the virtual-world application 164).

In operation, to test the virtual-world application 164 on a real-world user device 104, rendering manager 150 may be configured to run the virtual-world application 164 on a simulated user device 174 that corresponds to the real-world user device 104. Running the virtual-world application 164 on the simulated user device 174 may render the virtual environment 102 on the simulated user device 174, which mimics the virtual-world application 164 rendering the virtual environment 102 on the corresponding real-word user device 104. Rendering manager 150 may be configured to simulate navigation of the virtual environment by a user 106 (e.g., using a corresponding avatar 108) on the simulated user device 174 which may cause the virtual-world application 164 to render several views 112 of the virtual environment 102 as the virtual environment 102 is being navigated. With each view 112 of the virtual environment 102 that is rendered by the virtual-world application 164 on the simulated user device 174, the rendering manager 150 accesses an expected view pattern 170 from the memory 156 that corresponds to the rendered view 112 and compares the rendered view 112 with the corresponding expected view pattern 170. As described above, each expected view pattern 170 includes an expected pattern of visual elements 114 expected to be included in a corresponding view 112 of the virtual environment 102 rendered by the virtual-world application 164. The expected view pattern 170 typically includes a plurality of expected visual elements 172 arranged in the expected pattern. Based on comparing the rendered view 112 with the corresponding expected view pattern 170, rendering manager 150 may determine whether a pattern of visual elements 114 in the rendered view matches with the expected view pattern 170 associated with the rendered view 112. If the pattern of visual elements 114 actually rendered as part of the rendered view 112 does not match with the expected pattern of visual elements 114 as included in the expected view pattern 170, rendering manager 150 may determine that an error has occurred in rendering the view 112 of the virtual environment 102. In one embodiment, rendering manager 150 may use the machine learning model 168 to perform the operations of comparing the rendered view 112 with the corresponding expected view pattern 170, and determining whether a rendering error has occurred in relation to rendering the view 112 based on comparing the rendered view 112 to the corresponding expected view pattern 170.

Rendering manager 150 (e.g., using the machine learning model 168) may be configured to determine a nature of a rendering error in a view 112 rendered by the virtual-world application 164. A mismatch between the pattern of visual elements 114 actually rendered in a rendered view 112 and the expected pattern of visual elements 114 in a corresponding expected view pattern 170 may be caused by one or more of several rendering errors including, but not limited to, improperly rendered visual elements 114, misaligned visual elements 114, erroneous layout of one or more visual elements 114, partially loaded visual elements 114 and unloaded visual elements 114. Based on comparing the rendered view 112 with the corresponding expected view pattern 170, rendering manager 150 may be configured to determine one or more visual elements 114 in the rendered view 112 that are not rendered correctly by the virtual-world application 164. For example, based on comparing the rendered view 112 with the corresponding expected view pattern 170, rendering manager 150 may be configured to determine one or more visual elements 114 actually rendered in the rendered view 112 that do not match with respective one or more expected visual elements 172 in the expected view pattern 170. In response, rendering manager 150 may determine that there was an errors in rendering the one or more expected visual elements 172 by the virtual-world application 164. Additionally or alternatively, rendering manager 150 may be configured to determine the nature of error associated with the one or more expected visual elements 172 that were not rendered correctly. For example, based on comparing the actually rendered pattern of visual elements 114 with the expected pattern of visual elements 114 in the vicinity of an expected visual element 172 that was determined to be not rendered correctly, rendering manager (e.g. using machine learning model 168) may determine one or more type of rendering errors that caused the mismatch in the actually rendered and expected patterns. As noted above, the rendering errors may include, but are not limited to, improperly rendered visual elements 114, misaligned visual elements 114, erroneous layout of one or more visual elements 114, partially loaded visual elements 114 and unloaded visual elements 114.

It may be noted that while embodiments of the present disclosure describe detecting, identifying and resolving rendering errors associated with a virtual environment 102 by testing the virtual-world application 164 on a simulated user device 174, a person having ordinary skill in the art may appreciate that the same techniques may be implemented for testing the virtual-world application 164 on a real-world user device 104.

Detecting and Identifying Errors in Rendering Media Clips in a Virtual Environment Oftentimes the virtual environment 102 may include media clips 120 that are embedded in certain views 112 of the virtual environment 102. These media clips 120 may include a video clip or an audio clip configured to play within the virtual environment 102. It may be noted that the terms "media clip", "video clip" and "audio clip" may be used interchangeably in this disclosure. For example, a particular view 112 of the virtual environment 102 may be configured to play an informational video clip on a virtual display screen as an avatar 108 of a user 106 approaches the virtual display screen. Rendering errors may be associated with rendering a media clip 120 that is configured to play in the virtual environment 102.

Rendering manager 150 may be configured to detect and identify errors associated with generating/rendering media clips 120 by the virtual-world application 164 on a particular user device 104. A media clip 120 is usually a collection of frames 122 that are played in sequence at a certain speed. As shown in FIG. 1, media clip 120 includes frames 122a-122n. For example, when the media clip 120 is a video clip 120, each frame 122 of the video clip 120 is an image. Playing the video clip 120 includes playing a sequence of images on respective frames 122 at a certain speed. When the media clip 120 is an audio clip 120, each frame 122 of the audio clip 120 includes audio only. Several errors may occur when rendering a media clip 120 in the virtual environment 102. For example, a media clip 120 may be stuck at a particular frame 122, one or more frames may load partially, one or more frames 122 may not load at all causing the frames 122 to be skipped, audio associated with one or more frames 122 may load partially or not load at all, and/or one or more frames 122 are distorted.

It may be noted that while embodiments of the present disclosure describe detecting, identifying and resolving rendering errors associated with video clips 120, a person having ordinary skill in the art may appreciate that the same techniques may be used to detect, identify and resolve rendering errors associated with audio clips 120.

Rendering manager 150 may be configured to store metadata 188/189 associated with a video clip 120 configured to be rendered and/or actually rendered (e.g., previously rendered) by the virtual-world application 164 and played in the virtual environment 102. The metadata 188/189 associated with the video clip 120 includes information relating to video and audio elements on one or more frames 122 of the video clip. For example, the metadata 188/189 relating to a particular frame 122 of the video clip 120 may include video attributes associated with the particular frame 122 including, but not limited to, frame number, layout of colors, contrast ratio, video format and the image included in the particular frame. The metadata 188/189 relating to the particular frame 122 of the video clip 120 may further include audio attributes associated with the particular frame 122 including, but not limited to, the portion of audio included in the particular frame, volume level, and audio format.

As shown in FIG. 1, rendering manager 150 may store actual metadata 188 and expected metadata 189 associated with the video clip 120. The actual metadata 188 associated with the video clip 120 includes metadata of the video clip 120 as rendered by the virtual-world application 164 when testing on a real-world user device 104 or a simulated user device 174. The expected metadata 189 includes metadata associated with the video clip 120 when the video clip 120 is rendered without errors by the virtual-world application 164. As described below, the expected metadata 189 may be used as a reference to detect and identify rendering errors associated with rendering the video clip 120 while testing the virtual-world application 164 on a particular user device 104 or simulated user device 174.

Rendering manager 150 may be configured to convert a video clip 120 rendered by the virtual-world application 164 on a real-world user device 104 or simulated user device 174 into actual metadata 188 associated with the rendered video clip 120. For example, rendering manager 150 may be configured to extract information relating to video and audio attributes associated with frames 122 of the rendered video clip 120. The rendering manager 150 may be configured to store the information extracted from the rendered video clip 120 as part of the actual metadata 188 associated with the rendered video clip 120.

Rendering manager 150 may be configured to store a plurality of expected transitions 190 associated with the video clip 120. When a video clip 120 is playing, a fixed expected transition 190 is associated with each pair of consecutive one or more frames 122. For example, an expected transition 190 between two consecutive frames may include transition from a first image on a first frame 122 to a second image on a second frame 122 that is to be played next after the first frame 122. As long as the expected transitions 190 between the frames 122 of the video clip 120 are properly maintained, it may be safely assumed that the video clip 120 is playing properly. Thus, the expected transitions 190 include frame transitions associated with the video clip 120 when rendered without errors by the virtual-world application 164.

Rendering manager 150 may be configured to detect and identify errors in rendering the video clip 120 by the virtual-world application 164 on a particular user device 104 based on comparing an actually rendered video clip 120 to one or more of the expected metadata 188 and expected transitions 190 associated with the video clip 120. In certain embodiments, rendering manager 150 may be configured to use the machine learning model 168 to detect and identify rendering errors associated with rendering the video clip 120 on a real-world user device 104 or simulated user device 174. In one embodiment, the machine learning model 168 may use DCNN to detect the rendering errors associated with rendering the video clip 120 efficiently and accurately. Rendering manager 150 may be configured to train the machine learning model 168 based on one or more of the expected metadata 189 and expected transitions 190 associated with the video clip 120. Once trained, the machine learning model 168 may detect and identify rendering errors associated with rendering the video clip 120 on a particular user device 104.

In operation, to test rendering of the video clip 120 by the virtual-world application 164 on a real-world user device 104, rendering manager 150 may be configured to run the virtual-world application 164 on a simulated user device 174 that corresponds to the real-world user device 104. Running the virtual-world application 164 on the simulated user device 174 may render the virtual environment 102 on the simulated user device 174. Rendering manager 150 may be configured to simulate playing the video clip 120 within the rendered virtual environment 102. For example, when the video clip 120 is configured to render and play within the virtual environment 102 when an avatar 108 of a user 106 approaches a virtual display screen configured to play the video clip 120, the rendering manager 150 may simulate the avatar 108 approaching the virtual display screen to cause the virtual-world application 164 to render and play the video clip 120 on the virtual display screen. As the video clip 120 is being rendered and/or after the video clip 120 has been fully rendered, rendering manager 150 converts the rendered video clip 120 to actual metadata 188 by extracting information relating to video and audio attributes of frames 122 rendered for the video clip 120. Once generated, the actual metadata 188 associated with the rendered video clip 120 may be stored in the memory 156.

To determine whether rendering errors occurred while rendering the video clip 120, rendering manager 150 (e.g., using machine learning model 168) may be configured to compare the actual metadata 188 of the rendered frames 122 with each other. For example, actual metadata 188 associated with each rendered frame 122 is compared with the actual metadata 188 associated with neighboring one or more frames 122 of the frame 122. In one embodiment, actual metadata 188 associated with each rendered frame 122 is compared with the actual metadata 188 associated with the next frame 122 of the rendered video clip 120. Based on this comparison of actual metadata 188 between rendered frames 122, rendering manager 150 (e.g., using machine learning model 168) may be configured to determine whether each pair of consecutive frames 122 in the rendered video clip 120 conforms to a corresponding expected transition 190 associated with the pair of frames 122. For example, based on comparing the actual metadata 188 associated with two consecutive frames 122 of the rendered video clip 120, rendering manager 150 may determine an actual transition between the two frames 122. This actual transition may be compared with the expected transition 190 associated with the two frames 122. Rendering manager 150 may be configured to determine that two consecutive frames 122 in the rendered video clip 120 do not conform to the expected transition 190 associated with the two frames 122 when the actual transition between the frames based the actual metadata 188 of the frames does not match with the expected transition 190. In response to determining that the two frames of the rendered video clip 120 do not conform to the corresponding expected transition 190 between the two frames, rendering manager 150 (e.g., using the machine learning model) may be configured to determine that an error has occurred in relation to rendering the video clip 120 on the simulated user device 174.

In one example, rendering manager 150 (e.g., using machine learning model 168) may be configured to determine whether the rendered video clip 120 is stuck at a particular frame 122. For example, based on comparing actual metadata 188 associated with the particular frame 122 with actual metadata 188 associated with a next rendered frame 122, rendering manager 150 may determine that the actual metadata 188 associated with the particular frame 122 is the same or nearly the same as the actual metadata 188 associated with the next frame. In response, rendering manager 150 may be configured to determine that the rendered video clip 120 is stuck at the particular frame 122.

In one embodiment, rendering manager 150 may be configured to convert the frames 122 of the video clip 120 to respective actual metadata 188 as the frames 122 are being rendered, and compare metadata 188 associated with each newly rendered frame 122 with the metadata 188 of the previous frame 122 to determine conformance to a corresponding expected transition 190. In an additional or alternative embodiment, the rendering manager 150 converts the entire video clip 120 to the respective actual metadata 188 after the entire video clip 120 is finished rendering. Rendering manager 150 then compares actual metadata 188 associated with each frame 122 of the video clip to actual metadata 188 of its neighboring frame to determine conformance to a corresponding expected transition 190.

In certain embodiments, rendering manager 150 (e.g., using the machine learning model 168) may compare the actual metadata 188 associated with an actually rendered frame 122 with a corresponding expected metadata 189 associated with the frame 122. This comparison may include comparing actual video and audio attributes from the actual metadata 188 of the rendered frame 122 with corresponding expected attributes from the expected metadata 189. The rendering manager 150 may be configured to determine that an error has occurred in relation to rendering a frame 122 when one or more attributes from the actual metadata 188 do not match with corresponding one or more attributes from the expected metadata 189 of the frame 122. This allows the rendering manager 150 to detect and identify errors including, but not limited to, a partially loaded frame, a frame having poorly loaded or unloaded audio, and distorted frames.

Resolving Errors Associated with Rendering a Virtual Environment

Rendering manager 150 may be configured to resolve rendering errors associated with the virtual-world application 164 rendering the virtual environment 102 (including media clips 120 within the virtual environment 102) on a user device 104. Rendering manager 150 may be configured to store a solutions list 176 including a list of known errors 178 and one or more known solutions 180 corresponding to each known error 178. A known error 178 may include a rendering error previously encountered while testing the virtual-world application 164 on one or more user devices 104. A known solution 180 corresponding to a known error 178 may include a solution to the corresponding known error 178 that had previously resolved the known error 178. In one embodiment, a known solution 180 to a corresponding known error 178 may include a revised source code 182 and/or revise instructions 184. A revised source code 182 may include a revised version (e.g., revised lines of software code) of a portion of the source code 166 of the virtual-world application 164. For example, the revised source code 182 associated with a known error 178 may correspond to the portion of the source code 166 that is known to cause the corresponding known error 178. The revise instructions 184 associated with a known error 178 may include instructions to revise a portion of the source code 166 that is known to cause the known error 178.

In certain embodiments, rendering manager 150 may be configured to store a customized solutions list 176 for one or more user devices 104. For example, certain rendering errors may be known to be associated with rendering the virtual environment 102 on a particular user device 104. In this case, the rendering manager 150 may be configured to store a customized solutions list 176 for the particular user device 104 including a list of known errors 178 associated with rendering the virtual environment 102 on the user device 104, as well as one or more known solutions 180 corresponding to each known error 178.

As described in more detail below, rendering manager 150 may be configured to resolve a rendering error associated with the virtual-world application 164 rendering the virtual environment 102 on a user device 104 by determining from the solutions list 176 a known error 178 that corresponds to the actual rendering error and by applying the known solution 180 corresponding to the known error 178. Rendering manager 150 may be configured to use the machine learning model 168 to identify from the solutions list 176 a known error 178 that corresponds to an actual rendering error and to resolve the actual rendering error by applying a corresponding known solution 180 from the solutions list 176. In one embodiment, the machine learning model 168 may use DCNN to resolve a rendering error efficiently and accurately. Rendering manager 150 may be configured to train the machine learning model 168 based on one or more solutions list 176. Once trained, the machine learning model 168 may identify a known error 178 that corresponds to an actual rendering error and resolve the actual rendering error by applying a corresponding known solution 180.

In operation, when a rendering error is detected in relation to generating/rendering the virtual environment 102 (e.g., including generating/rendering a media clip 120 in the virtual environment 102) by the virtual-world application 164 on a real-world user device 104 or a corresponding simulated user device 174, rendering manager 150 (e.g., using machine learning model 168) may be configured to search a solutions list 176 for a known error 178 that corresponds to the detected rendering error. As described above, one or more known errors 178 in the solutions list 176 may correspond to rendering errors previously encountered while testing the virtual-world application 164 on the user device 104 or a corresponding simulated user device 174. In one embodiment, the known errors 178 may correspond to rendering errors previously encountered while testing a previous version of the virtual-world application 164 on the user device 104 or a corresponding simulated user device 174. In an additional or alternative embodiment, the known errors 178 may correspond to rendering errors previously encountered while testing the virtual-world application 164 on a previous version/model the user device 104 or a corresponding simulated user device 174.

In one embodiment, a known error 178 in the solutions list 176 may be identified by a unique error code. The rendering manager 150 (e.g., using the machine learning model 168) may be configured to determine an error code corresponding to the detected rendering error and then search the solutions list 176 for a known error 178 with a matching error code. The rendering manager 150 may be configured to determine the error code corresponding to the detected rendering error based on one or more visual elements 114 of the virtual environment 102 that were not rendered properly and/or one or more frames 122 of a video clip 120 that were not rendered properly. For example, an error code may be determined for a rendering error relating to rendering a particular visual element 114. Similarly, another error code may be determined for a rendering error relating to rendering a particular frame 122 of a video clip 120. In additional or alternative embodiments, rendering manager (e.g., using the machine learning model 168) may be configured to determine an error code relating to the detected rendering error based on a type of the detected rendering error associated with rendering the virtual environment 102 on the real-world user device 104 or corresponding simulated user device 174. As described above, rendering manager 150 may identify a type of error associated with rendering a visual element 114 or a frame 122. Thus, rendering manager 150 may be configured to determine an error code based on the particular visual element 114 or frame 122 that did not render properly and/or the type of error associated with rendering the visual element 114 or the frame 122. Once an error code is determined for the detected rendering error, rendering manager 150 may search the solutions list 176 for a known error 178 with a matching error code.

Upon identifying from the solutions list 176 a known error 178 that corresponds to the detected rendering error, the rendering manager 150 (e.g., using the machine learning model 168) obtains from the solutions list 176 a known solution that corresponds to the identified known error 178. As described above, a known solution 180 corresponding to a known error 178 may include a solution to the corresponding known error 178 that had previously resolved the known error 178. For example, the obtained known solution 180 corresponding to the identified known error 178 may include a revised source code 182 and/or revise instructions 184 to revise the source code 166 of the virtual-world application 164.

Rendering manager 150 (e.g., using the machine learning model 168) may be configured to identify a portion of the source code 166 of the virtual-world application 164 that relates to the detected rendering error. For example, as described above, based on comparing a rendered view 112 of the virtual environment 102 with a corresponding expected view pattern 170, rendering manager 150 may determine that the detected rendering error occurred in relation to rendering a particular expected visual element 172. Rendering manager 150 may be configured to identify a portion of the source code 166 that corresponds to (e.g., is responsible to render) the particular expected visual element 172. In another example, based on comparing actual metadata 188 relating to one or more frames 122 of a video clip 120 rendered in the virtual environment 102 to expected metadata 189 or expected transitions 190 relating to the one or more frames 122, rendering manager 150 may determine that the detected rendering error occurred in relation to rendering a particular frame 122 of the video clip 120. Rendering manager 150 may be configured to identify a portion of the source code 166 that corresponds to (e.g., is responsible to render) the particular frame 122 of the video clip 120.

Once the portion of the source code 166 that corresponds to the detected rendering error is identified, the rendering manager 150 (e.g., using the machine learning model 168) may be configured to resolve the detected rendering error by revising the identified portion of the source code 166 based on the revised source code 182 and/or revise instructions 184 obtained from the solutions list 176. For example, revising the identified portion of the source code 166 includes replacing the identified portion of the source code 166 with the revised source code 182.

In certain embodiments, the solutions list 176 may be a device-specific solutions list 176, wherein a device-specific solutions list 176 includes known errors 178 and corresponding known solutions 180 relating to rendering errors previously identified and resolved for a particular type of user device 104 (e.g., VR headset, smartphone, AR glasses etc.). When rendering manager 150 detects a rendering error as described above in relation to a particular user device 104 or a corresponding simulated user device 174, rendering manager 150 may be configured to search a solutions list 176 that corresponds to the type of the particular user device 104. In an alternative or additional embodiment, a solutions list 176 may include known errors 178 and known solutions 180 relating to several types of user devices 104. In this case, when the rendering manager 150 detects a rendering error in relation to a particular user device 104 or a corresponding simulated user device 174, rendering manager 150 may be configured to search the solutions list 176 for those known errors 178 that correspond to the type of the particular user device 104.

In certain embodiments, the solutions list 176 may not have a previously recorded known solution 180 corresponding to a detected rendering error associated with a particular user device 104. In such a case, in response to detecting that a known solution 180 does not exist in the solutions list 176 corresponding to the detected rendering error, the rendering manager 150 may be configured to store information relating to the detected rendering error in the memory 156. The information relating to the detected rendering error may include, but may not be limited to, one or more of a visual element 114 or frame 122 that was not rendered properly, a type of the rendering error, and a portion of the source code 166 that corresponds to the error. Rendering manager 150 may be configured to generate an error notification 186 relating to the detected rendering error, wherein the error notification 186 may include at least a portion of the information relating the detected rendering error. Rendering manager 150 may be configured to transmit the error notification 186 to a computing node of a user 106 (e.g., a support team member) responsible to resolve the detected rendering error. The support team member may manually resolve the rendering error by revising a portion of the source code 166. The rendering manager 150 may be configured to record the revision of the source code 166 as a known solution to the detected rendering error. Rendering manager may save the detected rendering error as a known error 178 and may save the revision of the source code 166 that resolved the rendering error as a known solution 180 corresponding to the known error 178. Rendering manager 150 may be configured to update the training of the machine learning model 168 based on newly added known errors 178 and known solutions 180 so that rendering errors that correspond to the newly detected and resolved rendering errors may be resolved automatically.

Figure 3:
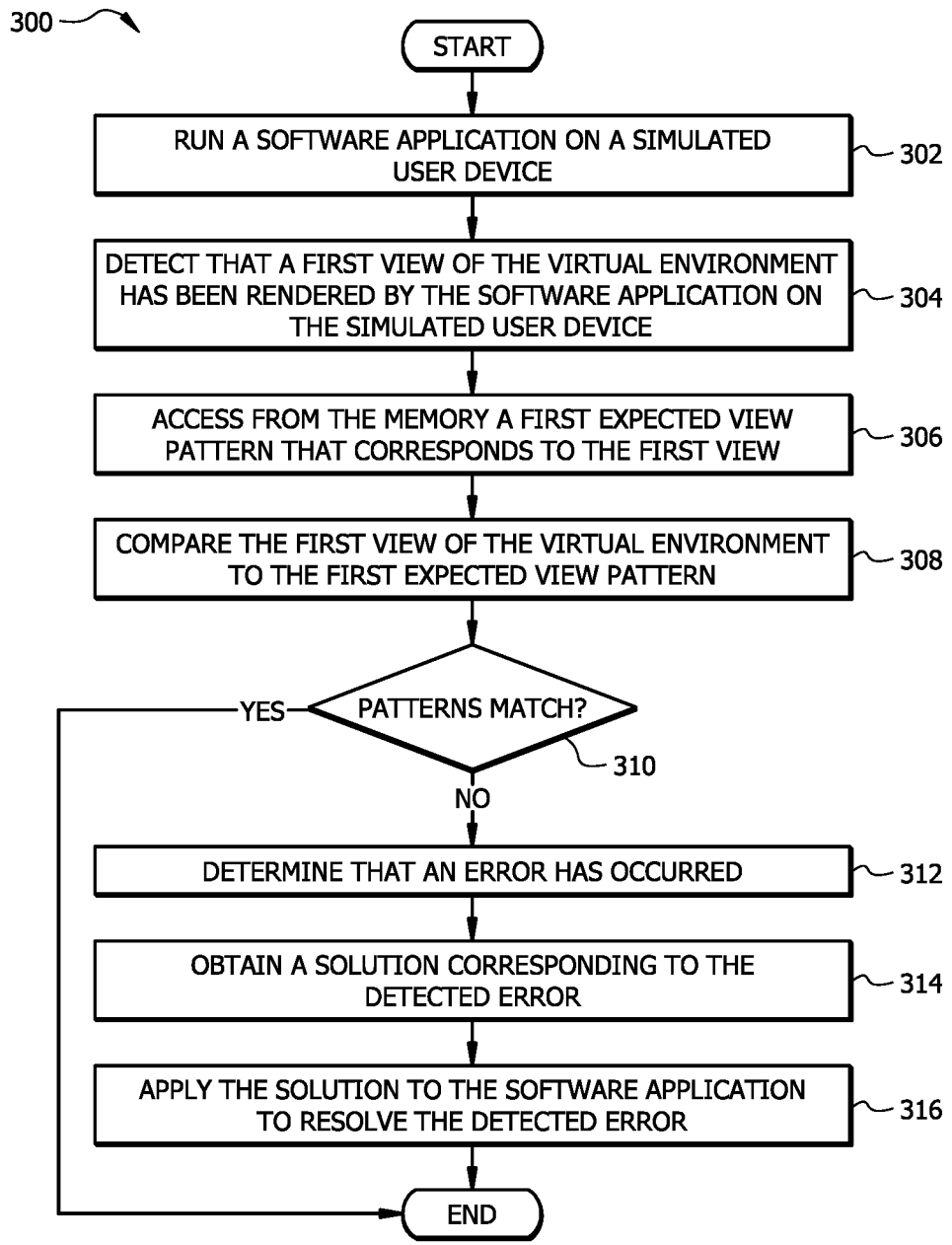
FIG. 3 illustrates a flowchart of an example method for detecting and identifying errors in rendering in a virtual environment, in accordance with one or more embodiments of the present disclosure.

FIG. 3 illustrates a flowchart of an example method 300 for detecting and identifying errors in rendering in a virtual environment 102, in accordance with one or more embodiments of the present disclosure. Method 300 may be performed by the rendering manager 150 shown in FIG. 1.

At operation 302, rendering manager 150 runs a software application (e.g., virtual-world application 164) on a simulated user device 174 to render a virtual environment 102 on the simulated user device 174, wherein the simulated user device 174 is a computer simulation of a real-world user device 104 configured to run the software application.

As described above, rendering manager 150 may be configured to test the virtual-world application 164 on simulated user devices 174, wherein a simulated user device 174 is a computer simulation of a real-world user device 104 that is configured to run the virtual-world application 164. In one embodiment, rendering manager 150 may be configured to store a plurality of simulated user devices 174 in memory 156. Rendering manager 150 may be configured to access a particular simulated user device 174 from the memory 156 as and when needed to test the virtual-world application 164. In an additional or alternative embodiment, rendering manager 150 may be configured to dynamically generate a simulated user device 174 corresponding to a real-world user device 104 (e.g., a new user device 104 or a new version thereof) as and when needed. Rendering manager may be configured to store a generated simulated user device 174 in the memory 156 for future use in testing the virtual-world application 164 (e.g., newer versions of the virtual-world application 164).

To test the virtual-world application 164 on a real-world user device 104, rendering manager 150 may be configured to run the virtual-world application 164 on a simulated user device 174 that corresponds to the real-world user device 104. Running the virtual-world application 164 on the simulated user device 174 may render the virtual environment 102 on the simulated user device 174, which mimics the virtual-world application 164 rendering the virtual environment 102 on the corresponding real-word user device 104.

At operation 304, rendering manager 150 detects that a first view 112 of the virtual environment 102 has been rendered by the virtual-world application 164. For example, as described above, rendering manager 150 may be configured to simulate navigation of the virtual environment by a user 106 (e.g., using a corresponding avatar 108) on the simulated user device 174 which may cause the virtual-world application 164 to render several views 112 of the virtual environment 102 as the virtual environment 102 is being navigated. A view 112 of the virtual environment 102 refers to a snapshot of the virtual environment 102 as rendered by the virtual-world application 164 on a user device 104. The virtual environment 102 may be viewed as a collection of a plurality of such views 112. A virtual environment 102 may include hundreds or even thousands of distinct views 112 depending on the complexity of the virtual environment 102. As shown in FIG. 1, a particular view 112 of the virtual environment 102 includes a unique pattern of visual elements 114 including, but not limited to, buildings, trees, cars, roads, avatars, devices, objects, media clips 120 and any other visual element that can be rendered and shown as part of the virtual environment 102. A pattern of visual elements 114 associated with a particular view 112 of the virtual environment 102 represents a unique arrangement of the visual elements 114 included in the particular view 112.

At operation 306, rendering manager 150 accesses from the memory 156 a first expected view pattern 170 of a plurality of expected view patterns 170, wherein the first expected view pattern 170 corresponds to the first view 112 of the virtual environment 102. As described above, with each view 112 of the virtual environment 102 that is rendered by the virtual-world application 164 on the simulated user device 174, the rendering manager 150 accesses an expected view pattern 170 from the memory 156 that corresponds to the rendered view 112.

Each expected view pattern 170 relates to a view 112 of the virtual environment 102 and comprises an expected pattern of one or more expected visual elements 172 included in the view 112. Rendering manager 150 may be configured to store a plurality of expected view patterns 170, wherein each expected view pattern 170 corresponds to a particular view 112 of the virtual environment 102 that can be rendered by the virtual-world application 164 and includes an expected pattern of expected visual elements 172 in a corresponding view 112 of the virtual environment 102. In other words, an expected view pattern 170 stores a snapshot of a corresponding view 112 of the virtual environment 102 and includes a pattern of visual elements 114 that is expected to be displayed on a user device 104 if the corresponding view 112 is rendered without errors by the virtual-world application on the user device 104. In one embodiment, rendering manager 150 stores an expected view pattern 170 corresponding to each view 112 that can be rendered by the virtual-world application 164.

At operation 308, rendering manager 150 compares the first view 112 of the virtual environment 102 to the first expected view pattern 170.

At operation 310, rendering manager 150 checks whether a pattern of one or more visual elements 114 in the first view 112 matches with the expected pattern of expected visual elements 172 in the first expected view pattern 170.

As described above, with each view 112 of the virtual environment 102 that is rendered by the virtual-world application 164 on the simulated user device 174, the rendering manager 150 accesses an expected view pattern 170 from the memory 156 that corresponds to the rendered view 112 and compares the rendered view 112 with the corresponding expected view pattern 170. As described above, each expected view pattern 170 includes an expected pattern of visual elements 114 expected to be included in a corresponding view 112 of the virtual environment 102 rendered by the virtual-world application 164. The expected view pattern 170 typically includes a plurality of expected visual elements 172 arranged in the expected pattern. Based on comparing the rendered view 112 with the corresponding expected view pattern 170, rendering manager 150 may determine whether a pattern of visual elements 114 in the rendered view matches with the expected view pattern 170 associated with the rendered view 112.

At operation 310, if the pattern of one or more visual elements 114 in the first view 112 matches with the expected pattern of expected visual elements 172 in the first expected view pattern 170, method 300 ends here. However, if the pattern of one or more visual elements 114 in the first view 112 does not match with the expected pattern of expected visual elements 172 in the first expected view pattern 170, method 300 proceeds to operation 312.

At operation 312, in response to detecting that the pattern of one or more visual elements 114 in the first view 112 does not match with the expected pattern of expected visual elements 172 in the first expected view pattern 170, rendering manager 150 determines that an error has occurred relating to the generation/rendering of the first view 112 of the virtual environment 102 by the virtual-world application 164 on the simulated user device 174. As descried above, ff the pattern of visual elements 114 actually rendered as part of the rendered view 112 does not match with the expected pattern of visual elements 114 as included in the expected view pattern 170, rendering manager 150 may determine that an error has occurred in rendering the view 112 of the virtual environment 102.

At operation 314, rendering manager 150 obtains a solution (e.g., known solution 180) corresponding to the detected rendering error.

At operation 316, rendering manager 150 applies the obtained known solution 180 to the virtual-world application 164 to resolve the detected rendering error.

As described above, when a rendering error is detected in relation to generating/rendering the virtual environment 102 by the virtual-world application 164 on a real-world user device 104 or a corresponding simulated user device 174, rendering manager 150 (e.g., using machine learning model 168) may be configured to search a solutions list 176 for a known error 178 that corresponds to the detected rendering error. As described above, one or more known errors 178 in the solutions list 176 may correspond to rendering errors previously encountered while testing the virtual-world application 164 on the user device 104 or a corresponding simulated user device 174.

Upon identifying from the solutions list 176 a known error 178 that corresponds to the detected rendering error, the rendering manager 150 (e.g., using the machine learning model 168) obtains from the solutions list 176 a known solution that corresponds to the identified known error 178. As described above, a known solution 180 corresponding to a known error 178 may include a solution to the corresponding known error 178 that had previously resolved the known error 178. For example, the obtained known solution 180 corresponding to the identified known error 178 may include a revised source code 182 and/or revise instructions 184 to revise the source code 166 of the virtual-world application 164. Rendering manager 150 (e.g., using the machine learning model 168) may be configured to identify a portion of the source code 166 of the virtual-world application 164 that relates to the detected rendering error. Once the portion of the source code 166 that corresponds to the detected rendering error is identified, the rendering manager 150 (e.g., using the machine learning model 168) may be configured to resolve the detected rendering error by revising the identified portion of the source code 166 based on the revised source code 182 and/or revise instructions 184 obtained from the solutions list 176. For example, revising the identified portion of the source code 166 includes replacing the identified portion of the source code 166 with the revised source code 182.

In certain embodiments, the solutions list 176 may not have a previously recorded known solution 180 corresponding to a detected rendering error associated with a particular user device 104. In such a case, in response to detecting that a known solution 180 does not exist in the solutions list 176 corresponding to the detected rendering error, the rendering manager 150 may be configured to store information relating to the detected rendering error in the memory 156. The information relating to the detected rendering error may include, but may not be limited to, one or more of a visual element 114 that was not rendered properly, a type of the rendering error, and a portion of the source code 166 that corresponds to the error. Rendering manager 150 may be configured to generate an error notification 186 relating to the detected rendering error, wherein the error notification 186 may include at least a portion of the information relating the detected rendering error. Rendering manager 150 may be configured to transmit the error notification 186 to a computing node of a user 106 (e.g., a support team member) responsible to resolve the detected rendering error. The support team member may manually resolve the rendering error by revising a portion of the source code 166. For example, rendering manager 150 may receive a solution (e.g., revised source code) relating to the detected rendering error in response to the error notification 186, and may apply the received solution to the virtual-world application 164 to resolve the detected rendering error. The rendering manager 150 may be configured to record the revision of the source code 166 as a known solution to the detected rendering error. Rendering manager may save the detected rendering error as a known error 178 and may save the revision of the source code 166 that resolved the rendering error as a known solution 180 corresponding to the known error 178. Rendering manager 150 may be configured to update the training of the machine learning model 168 based on newly added known errors 178 and known solutions 180 so that rendering errors that correspond to the newly detected and resolved rendering errors may be resolved automatically.

In certain embodiments, rendering manager 150 may be configured to use a machine learning model 168 to detect and identify rendering errors associated with rendering the virtual environment 102 on a user device 104. For example, rendering manager 150 may use the machine learning model 168 to perform the operations of comparing the rendered view 112 with the corresponding expected view pattern 170, and determining whether a rendering error has occurred in relation to rendering the view 112 based on comparing the rendered view 112 to the corresponding expected view pattern 170. In one embodiment, the machine learning model 168 may use deep convolutional neural networks (DCNN) to detect the rendering errors associated with the virtual environment 102 efficiently and accurately. Rendering manager 150 may be configured to train the machine learning model 168 based on the expected view patterns 170 to detect and identify visual errors associated with rendering the virtual environment 102 on a user device 104. Once trained, the machine learning model 168 may detect and identify rendering errors associated with virtual environment 102 on the user device 104.

Rendering manager 150 (e.g., using the machine learning model 168) may be configured to determine a nature of a rendering error in a view 112 rendered by the virtual-world application 164. A mismatch between the pattern of visual elements 114 actually rendered in a rendered view 112 and the expected pattern of visual elements 114 in a corresponding expected view pattern 170 may be caused by one or more of several rendering errors including, but not limited to, improperly rendered visual elements 114, misaligned visual elements 114, erroneous layout of one or more visual elements 114, partially loaded visual elements 114 and unloaded visual elements 114. Based on comparing the rendered view 112 with the corresponding expected view pattern 170, rendering manager 150 may be configured to determine one or more visual elements 114 in the rendered view 112 that are not rendered correctly by the virtual-world application 164. For example, based on comparing the rendered view 112 with the corresponding expected view pattern 170, rendering manager 150 may be configured to determine one or more visual elements 114 actually rendered in the rendered view 112 that do not match with respective one or more expected visual elements 172 in the expected view pattern 170. In response, rendering manager 150 may determine that there was an errors in rendering the one or more expected visual elements 172 by the virtual-world application 164.

Additionally or alternatively, rendering manager 150 may be configured to determine the nature of error associated with the one or more expected visual elements 172 that were not rendered correctly. For example, based on comparing the actually rendered pattern of visual elements 114 with the expected pattern of visual elements 114 in the vicinity of an expected visual element 172 that was determined to be not rendered correctly, rendering manager (e.g. using machine learning model 168) may determine one or more type of rendering errors that caused the mismatch in the actually rendered and expected patterns. As noted above, the rendering errors may include, but are not limited to, improperly rendered visual elements 114, misaligned visual elements 114, erroneous layout of one or more visual elements 114, partially loaded visual elements 114 and unloaded visual elements 114.

Figure 4:
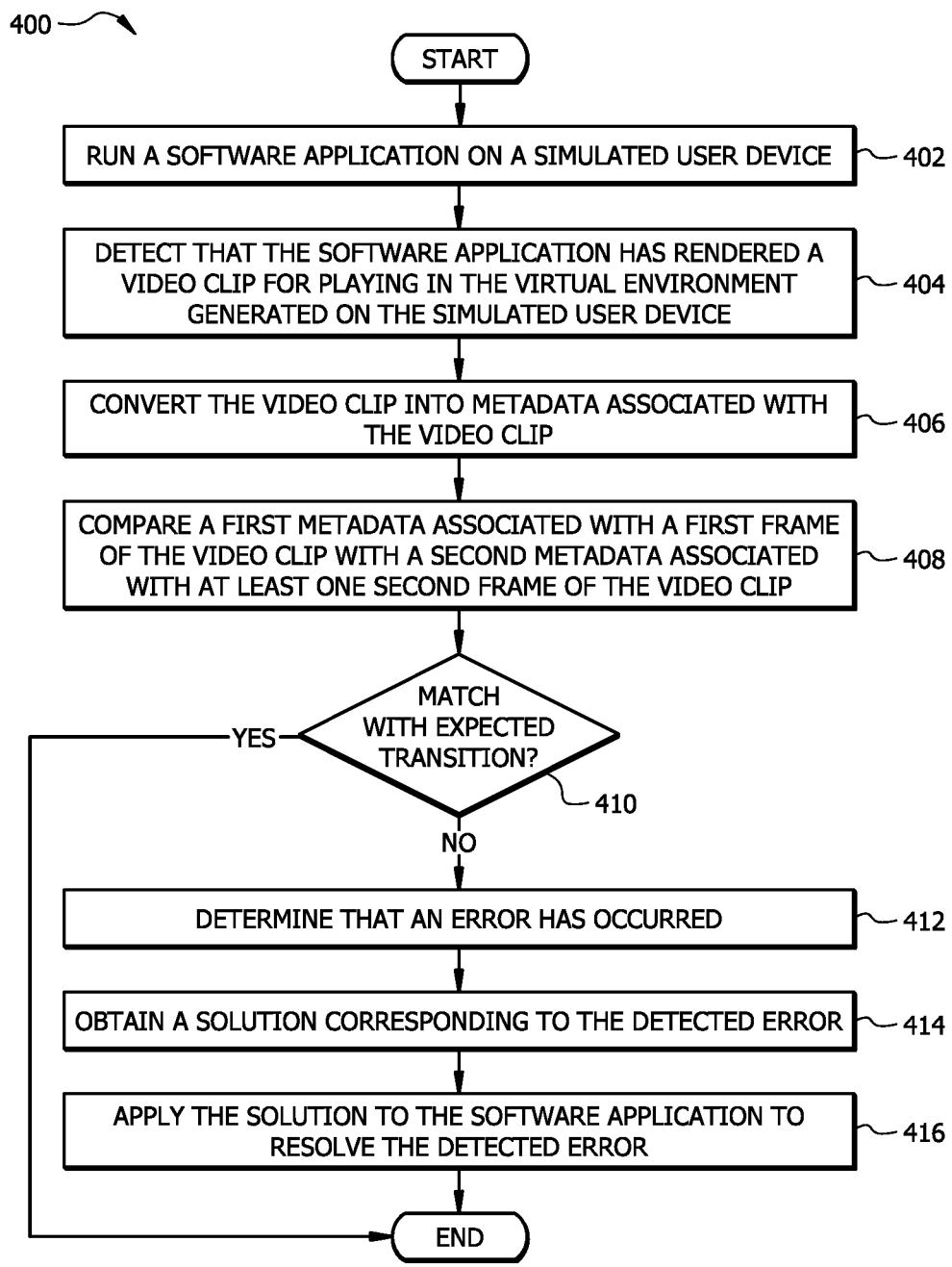
FIG. 4 illustrates a flowchart of an example method for detecting and identifying errors in rendering in a media clip in a virtual environment, in accordance with one or more embodiments of the present disclosure.

FIG. 4 illustrates a flowchart of an example method 300 for detecting and identifying errors in rendering in a media clip 120 in a virtual environment 102, in accordance with one or more embodiments of the present disclosure. Method 400 may be performed by the rendering manager 150 shown in FIG. 1.

At operation 402, rendering manager 150 runs a software application (e.g., virtual-world application 164) on a simulated user device 174 to render a virtual environment 102 on the simulated user device 174, wherein the simulated user device 174 is a computer simulation of a real-world user device 104 configured to run the software application.

As described above, rendering manager 150 may be configured to test the virtual-world application 164 on simulated user devices 174, wherein a simulated user device 174 is a computer simulation of a real-world user device 104 that is configured to run the virtual-world application 164. In one embodiment, rendering manager 150 may be configured to store a plurality of simulated user devices 174 in memory 156. Rendering manager 150 may be configured to access a particular simulated user device 174 from the memory 156 as and when needed to test the virtual-world application 164. In an additional or alternative embodiment, rendering manager 150 may be configured to dynamically generate a simulated user device 174 corresponding to a real-world user device 104 (e.g., a new user device 104 or a new version thereof) as and when needed. Rendering manager may be configured to store a generated simulated user device 174 in the memory 156 for future use in testing the virtual-world application 164 (e.g., newer versions of the virtual-world application 164).

To test the virtual-world application 164 on a real-world user device 104, rendering manager 150 may be configured to run the virtual-world application 164 on a simulated user device 174 that corresponds to the real-world user device 104. Running the virtual-world application 164 on the simulated user device 174 may render the virtual environment 102 on the simulated user device 174, which mimics the virtual-world application 164 rendering the virtual environment 102 on the corresponding real-word user device 104.

At operation 404, rendering manager 150 detects that the virtual-world application has rendered a video clip 120 for playing in the virtual environment 102 generated on the simulated user device 174. As described above, to test rendering of the video clip 120 by the virtual-world application 164 on a real-world user device 104, rendering manager 150 may be configured to run the virtual-world application 164 on a simulated user device 174 that corresponds to the real-world user device 104. Running the virtual-world application 164 on the simulated user device 174 may render the virtual environment 102 on the simulated user device 174. Rendering manager 150 may be configured to simulate playing the video clip 120 within the rendered virtual environment 102. For example, when the video clip 120 is configured to render and play within the virtual environment 102 when an avatar 108 of a user 106 approaches a virtual display screen configured to play the video clip 120, the rendering manager 150 may simulate the avatar 108 approaching the virtual display screen to cause the virtual-world application 164 to render and play the video clip 120 on the virtual display screen.

At operation 406, rendering manager 150 converts the video clip 120 into metadata (e.g., actual metadata 188) associated with the video clip 120, wherein the metadata 188 comprises information relating to video and audio elements on one or more frames of the video clip. As described above, as the video clip 120 is being rendered and/or after the video clip 120 has been fully rendered, rendering manager 150 converts the rendered video clip 120 to actual metadata 188 by extracting information relating to video and audio attributes of frames 122 rendered for the video clip 120. Once generated, the actual metadata 188 associated with the rendered video clip 120 may be stored in the memory 156. The actual metadata 188 associated with the video clip 120 includes information relating to video and audio elements on one or more frames 122 of the video clip. For example, the actual metadata 188 relating to a particular frame 122 of the video clip 120 may include video attributes associated with the particular frame 122 including, but not limited to, frame number, layout of colors, contrast ratio, video format and the image included in the particular frame. The actual metadata 188 relating to the particular frame 122 of the video clip 120 may further include audio attributes associated with the particular frame 122 including, but not limited to, the portion of audio included in the particular frame, volume level, and audio format.

At operation 408, rendering manager 150 compares a first metadata (e.g., actual metadata 188) associated with a first frame 122 of the video clip 120 with a second metadata (e.g., actual metadata 188) associated with at least one second frame 122 of the video clip 120 before or after the first frame 122. As described above, to determine whether rendering errors occurred while rendering the video clip 120, rendering manager 150 (e.g., using machine learning model 168) may be configured to compare the actual metadata 188 of the rendered frames 122 with each other. For example, actual metadata 188 associated with each rendered frame 122 is compared with the actual metadata 188 associated with neighboring one or more frames 122 of the frame 122. In one embodiment, actual metadata 188 associated with each rendered frame 122 is compared with the actual metadata 188 associated with the next frame 122 of the rendered video clip 120.

At operation 410, rendering manager 150 checks whether the first frame 122 of the video clip 120 and the at least one second frame 122 of the video clip 120 conform to a pre-configured transition (e.g., expected transition 190) associated with the first frame 122 and the at least one second frame 122. As described above, based on a comparison of actual metadata 188 between rendered frames 122, rendering manager 150 (e.g., using machine learning model 168) may be configured to determine whether each pair of consecutive frames 122 in the rendered video clip 120 conforms to a corresponding expected transition 190 associated with the pair of frames 122. For example, based on comparing the actual metadata 188 associated with two consecutive frames 122 of the rendered video clip 120, rendering manager 150 may determine an actual transition between the two frames 122. This actual transition may be compared with the expected transition 190 associated with the two frames 122.

At operation 410, if the first frame 122 of the video clip 120 and the at least one second frame 122 of the video clip 120 conform to the pre-configured transition (e.g., expected transition 190) associated with the first frame 122 and the at least one second frame 122, method 400 ends here. However, if the first frame 122 of the video clip 120 and the at least one second frame 122 of the video clip 120 do not conform to the pre-configured transition (e.g., expected transition 190) associated with the first frame 122 and the at least one second frame 122, method 400 proceeds to operation 412.

At operation 412, in response to determining that the first frame 122 of the video clip 120 and the at least one second frame 122 of the video clip 120 do not conform to a pre-configured transition (e.g., expected transition 190) associated with the first frame 122 and the at least one second frame 122, rendering manager 150 determines that an error has occurred in relation to rendering the video clip 120 in the virtual environment 102 on the simulated user device 174. As described above, rendering manager 150 may be configured to determine that two consecutive frames 122 in the rendered video clip 120 do not conform to the expected transition 190 associated with the two frames 122 when the actual transition between the frames based the actual metadata 188 of the frames does not match with the expected transition 190. In response to determining that the two frames of the rendered video clip 120 do not conform to the corresponding expected transition 190 between the two frames, rendering manager 150 (e.g., using the machine learning model) may be configured to determine that an error has occurred in relation to rendering the video clip 120 on the simulated user device 174.

At operation 414, rendering manager 150 obtains a solution (e.g., known solution 180) corresponding to the detected rendering error.

At operation 416, rendering manager 150 applies the obtained known solution 180 to the virtual-world application 164 to resolve the detected rendering error.

As described above, when a rendering error is detected in relation to generating/rendering a video clip 120 in the virtual environment 102 by the virtual-world application 164 on a real-world user device 104 or a corresponding simulated user device 174, rendering manager 150 (e.g., using machine learning model 168) may be configured to search a solutions list 176 for a known error 178 that corresponds to the detected rendering error. As described above, one or more known errors 178 in the solutions list 176 may correspond to rendering errors previously encountered while testing the virtual-world application 164 on the user device 104 or a corresponding simulated user device 174.

Upon identifying from the solutions list 176 a known error 178 that corresponds to the detected rendering error, the rendering manager 150 (e.g., using the machine learning model 168) obtains from the solutions list 176 a known solution that corresponds to the identified known error 178. As described above, a known solution 180 corresponding to a known error 178 may include a solution to the corresponding known error 178 that had previously resolved the known error 178. For example, the obtained known solution 180 corresponding to the identified known error 178 may include a revised source code 182 and/or revise instructions 184 to revise the source code 166 of the virtual-world application 164. Rendering manager 150 (e.g., using the machine learning model 168) may be configured to identify a portion of the source code 166 of the virtual-world application 164 that relates to the detected rendering error. Once the portion of the source code 166 that corresponds to the detected rendering error is identified, the rendering manager 150 (e.g., using the machine learning model 168) may be configured to resolve the detected rendering error by revising the identified portion of the source code 166 based on the revised source code 182 and/or revise instructions 184 obtained from the solutions list 176. For example, revising the identified portion of the source code 166 includes replacing the identified portion of the source code 166 with the revised source code 182.

In certain embodiments, the solutions list 176 may not have a previously recorded known solution 180 corresponding to a detected rendering error associated with a particular user device 104. In such a case, in response to detecting that a known solution 180 does not exist in the solutions list 176 corresponding to the detected rendering error, the rendering manager 150 may be configured to store information relating to the detected rendering error in the memory 156. The information relating to the detected rendering error may include, but may not be limited to, one or more of a one or more frames 122 that were not rendered properly, a type of the rendering error, and a portion of the source code 166 that corresponds to the error. Rendering manager 150 may be configured to generate an error notification 186 relating to the detected rendering error, wherein the error notification 186 may include at least a portion of the information relating the detected rendering error. Rendering manager 150 may be configured to transmit the error notification 186 to a computing node of a user 106 (e.g., a support team member) responsible to resolve the detected rendering error. The support team member may manually resolve the rendering error by revising a portion of the source code 166. For example, rendering manager 150 may receive a solution (e.g., revised source code) relating to the detected rendering error in response to the error notification 186, and may apply the received solution to the virtual-world application 164 to resolve the detected rendering error. The rendering manager 150 may be configured to record the revision of the source code 166 as a known solution to the detected rendering error. Rendering manager may save the detected rendering error as a known error 178 and may save the revision of the source code 166 that resolved the rendering error as a known solution 180 corresponding to the known error 178. Rendering manager 150 may be configured to update the training of the machine learning model 168 based on newly added known errors 178 and known solutions 180 so that rendering errors that correspond to the newly detected and resolved rendering errors may be resolved automatically.

In certain embodiments, rendering manager 150 may be configured to use a machine learning model 168 to detect and identify rendering errors associated with rendering a video clip 120 in the virtual environment 102 on a real-world user device 104 or simulated user device 174. Rendering manager 150 may be configured to train the machine learning model 168 based on one or more of the expected metadata 189 and expected transitions 190 associated with the video clip 120. Once trained, the machine learning model 168 may detect and identify rendering errors associated with rendering the video clip 120 on a particular user device 104. For example, rendering manager 150 may use the trained machine learning model 168 to determine an actual transition between two or more frames 122 of the video clip 120 rendered by the virtual-world application 164 based on metadata 188 relating to the two or more frames 122, compare the determined actual transition to a corresponding expected transition 190 associated with the two or more frames 122, determine that the two or more frames 122 of the video clip 120 do not match with the expected transition 190 associated with the two or more frames 122, and in response determine that an error has occurred in relation to rendering the video clip 120.

In one example, rendering manager 150 (e.g., using machine learning model 168) may be configured to determine whether the rendered video clip 120 is stuck at a particular frame 122. For example, based on comparing actual metadata 188 associated with the particular frame 122 with actual metadata 188 associated with a next rendered frame 122, rendering manager 150 may determine that the actual metadata 188 associated with the particular frame 122 is the same or nearly the same as the actual metadata 188 associated with the next frame. In response, rendering manager 150 may be configured to determine that the rendered video clip 120 is stuck at the particular frame 122.

In one embodiment, rendering manager 150 may be configured to convert the frames 122 of the video clip 120 to respective actual metadata 188 as the frames 122 are being rendered, and compare metadata 188 associated with each newly rendered frame 122 with the metadata 188 of the previous frame 122 to determine conformance to a corresponding expected transition 190. In an additional or alternative embodiment, the rendering manager 150 converts the entire video clip 120 to the respective actual metadata 188 after the entire video clip 120 is finished rendering. Rendering manager 150 then compares actual metadata 188 associated with each frame 122 of the video clip to actual metadata 188 of its neighboring frame to determine conformance to a corresponding expected transition 190.

In certain embodiments, rendering manager 150 (e.g., using the machine learning model 168) may compare the actual metadata 188 associated with an actually rendered frame 122 with a corresponding expected metadata 189 associated with the frame 122. This comparison may include comparing actual video and audio attributes from the actual metadata 188 of the rendered frame 122 with corresponding expected attributes from the expected metadata 189. The rendering manager 150 may be configured to determine that an error has occurred in relation to rendering a frame 122 when one or more attributes from the actual metadata 188 do not match with corresponding one or more attributes from the expected metadata 189 of the frame 122. This allows the rendering manager 150 to detect and identify errors including, but not limited to, a partially loaded frame, a frame having poorly loaded or unloaded audio, and distorted frames.

Figure 5:
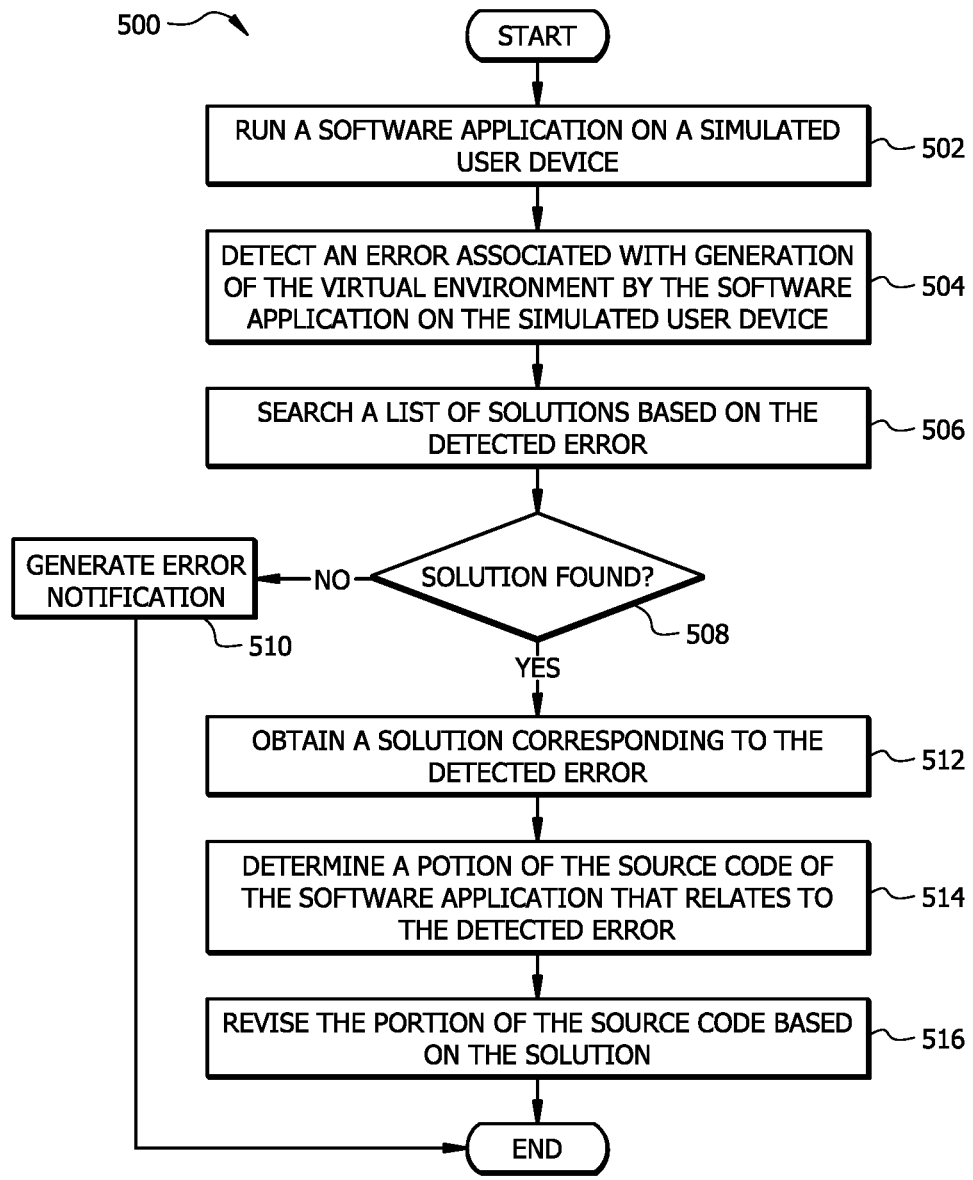
FIG. 5 illustrates a flowchart of an example method 500 for resolving errors in rendering a virtual environment 102, in accordance with one or more embodiments of the present disclosure.

FIG. 5 illustrates a flowchart of an example method 500 for resolving errors in rendering a virtual environment 102, in accordance with one or more embodiments of the present disclosure. Method 500 may be performed by the rendering manager 150 shown in FIG. 1.

At operation 502, rendering manager 150 runs a software application (e.g., virtual-world application 164) on a simulated user device 174 to render a virtual environment 102 on the simulated user device 174, wherein the simulated user device 174 is a computer simulation of a real-world user device 104 configured to run the software application.

As described above, rendering manager 150 may be configured to test the virtual-world application 164 on simulated user devices 174, wherein a simulated user device 174 is a computer simulation of a real-world user device 104 that is configured to run the virtual-world application 164. In one embodiment, rendering manager 150 may be configured to store a plurality of simulated user devices 174 in memory 156. Rendering manager 150 may be configured to access a particular simulated user device 174 from the memory 156 as and when needed to test the virtual-world application 164. In an additional or alternative embodiment, rendering manager 150 may be configured to dynamically generate a simulated user device 174 corresponding to a real-world user device 104 (e.g., a new user device 104 or a new version thereof) as and when needed. Rendering manager may be configured to store a generated simulated user device 174 in the memory 156 for future use in testing the virtual-world application 164 (e.g., newer versions of the virtual-world application 164).

To test the virtual-world application 164 on a real-world user device 104, rendering manager 150 may be configured to run the virtual-world application 164 on a simulated user device 174 that corresponds to the real-world user device 104. Running the virtual-world application 164 on the simulated user device 174 may render the virtual environment 102 on the simulated user device 174, which mimics the virtual-world application 164 rendering the virtual environment 102 on the corresponding real-word user device 104.

At operation 504, rendering manager 150 detects an error associated with generation of the virtual environment 102 by the virtual-world application 164 on the simulated user device 174. As described above, rendering manager 150 may be configured to detect a rendering error associated with rendering the virtual environment 102 and/or a media clip 120 to be played in the virtual environment 102.

At operation 506, rendering manager 150 searches a list of solutions (e.g., solutions list 176) based on the detected error, wherein each solution (e.g., known solution 180) in the solutions list 176 corresponds to a known error 178 associated with generation of the virtual environment 102 on the real-world user device 104.

As described above, rendering manager 150 may be configured to store a solutions list 176 including a list of known errors 178 and one or more known solutions 180 corresponding to each known error 178. A known error 178 may include a rendering error previously encountered while testing the virtual-world application 164 on one or more user devices 104. A known solution 180 corresponding to a known error 178 may include a solution to the corresponding known error 178 that had previously resolved the known error 178. In one embodiment, a known solution 180 to a corresponding known error 178 may include a revised source code 182 and/or revise instructions 184. A revised source code 182 may include a revised version (e.g., revised lines of software code) of a portion of the source code 166 of the virtual-world application 164. For example, the revised source code 182 associated with a known error 178 may correspond to the portion of the source code 166 that is known to cause the corresponding known error 178. The revise instructions 184 associated with a known error 178 may include instructions to revise a portion of the source code 166 that is known to cause the known error 178.

In certain embodiments, rendering manager 150 may be configured to store a customized solutions list 176 for one or more user devices 104. For example, certain rendering errors may be known to be associated with rendering the virtual environment 102 on a particular user device 104. In this case, the rendering manager 150 may be configured to store a customized solutions list 176 for the particular user device 104 including a list of known errors 178 associated with rendering the virtual environment 102 on the user device 104, as well as one or more known solutions 180 corresponding to each known error 178.

When a rendering error is detected in relation to generating/rendering the virtual environment 102 (e.g., including generating/rendering a media clip 120 in the virtual environment 102) by the virtual-world application 164 on a real-world user device 104 or a corresponding simulated user device 174, rendering manager 150 (e.g., using machine learning model 168) may be configured to search a solutions list 176 for a known error 178 (and corresponding known solution 180) that corresponds to the detected rendering error. As described above, one or more known errors 178 in the solutions list 176 may correspond to rendering errors previously encountered while testing the virtual-world application 164 on the user device 104 or a corresponding simulated user device 174. In one embodiment, the known errors 178 may correspond to rendering errors previously encountered while testing a previous version of the virtual-world application 164 on the user device 104 or a corresponding simulated user device 174. In an additional or alternative embodiment, the known errors 178 may correspond to rendering errors previously encountered while testing the virtual-world application 164 on a previous version/model the user device 104 or a corresponding simulated user device 174.

In one embodiment, a known error 178 in the solutions list 176 may be identified by a unique error code. The rendering manager 150 (e.g., using the machine learning model 168) may be configured to determine an error code corresponding to the detected rendering error and then search the solutions list 176 for a known error 178 with a matching error code. The rendering manager 150 may be configured to determine the error code corresponding to the detected rendering error based on one or more visual elements 114 of the virtual environment 102 that were not rendered properly and/or one or more frames 122 of a video clip 120 that were not rendered properly. For example, an error code may be determined for a rendering error relating to rendering a particular visual element 114. Similarly, another error code may be determined for a rendering error relating to rendering a particular frame 122 of a video clip 120. In additional or alternative embodiments, rendering manager (e.g., using the machine learning model 168) may be configured to determine an error code relating to the detected rendering error based on a type of the detected rendering error associated with rendering the virtual environment 102 on the real-world user device 104 or corresponding simulated user device 174. As described above, rendering manager 150 may identify a type of error associated with rendering a visual element 114 or a frame 122. Thus, rendering manager 150 may be configured to determine an error code based on the particular visual element 114 or frame 122 that did not render properly and/or the type of error associated with rendering the visual element 114 or the frame 122. Once an error code is determined for the detected rendering error, rendering manager 150 may search the solutions list 176 for a known error 178 with a matching error code.

At operation 508, rendering manager 150 checks whether a known solution 180 corresponding to the detected rendering error exists in the solutions list 176. For example, based on searching the solutions list 176 for a known error 178 and corresponding known solution 180 that corresponds to the detected rendering error, the rendering manager 150 may determine whether a known solution 180 corresponding to the detected rendering error exists in the solutions list 176.

If a known solution 180 corresponding to the detected rendering error is not found in the solutions list 176, method 500 proceeds to operation 510 where the rendering manager 150 generates an error notification 186 corresponding to the detected rendering error.

As described above, the solutions list 176 may not have a previously recorded a known solution 180 corresponding to a detected rendering error associated with a particular user device 104. In such a case, in response to detecting that a known solution 180 does not exist in the solutions list 176 corresponding to the detected rendering error, the rendering manager 150 may be configured to store information relating to the detected rendering error in the memory 156. The information relating to the detected rendering error may include, but may not be limited to, one or more of a visual element 114 or one or more frames 122 that were not rendered properly, a type of the rendering error, and a portion of the source code 166 that corresponds to the error. Rendering manager 150 may be configured to generate an error notification 186 relating to the detected rendering error, wherein the error notification 186 may include at least a portion of the information relating the detected rendering error. Rendering manager 150 may be configured to transmit the error notification 186 to a computing node of a user 106 (e.g., a support team member) responsible to resolve the detected rendering error. The support team member may manually resolve the rendering error by revising a portion of the source code 166. For example, rendering manager 150 may receive a solution (e.g., revised source code) relating to the detected rendering error in response to the error notification 186, and may apply the received solution to the virtual-world application 164 to resolve the detected rendering error. The rendering manager 150 may be configured to record the revision of the source code 166 as a known solution to the detected rendering error. Rendering manager may save the detected rendering error as a known error 178 and may save the revision of the source code 166 that resolved the rendering error as a known solution 180 corresponding to the known error 178. Rendering manager 150 may be configured to update the training of the machine learning model 168 based on newly added known errors 178 and known solutions 180 so that rendering errors that correspond to the newly detected and resolved rendering errors may be resolved automatically.

Referring back to operation 508, if a known solution 180 corresponding to the detected rendering error is found in the solutions list 176, method 500 proceeds to operation 512 where rendering manager 150 obtains (e.g., identifies) the known solution 180 corresponding to the detected rendering error from the solutions list 176. The identified known solution 180 corresponding to the detected rendering error may include a revised source code 182 and/or revise instructions 184 to revise the source code 166 of the virtual-world application 164.

As described above, upon identifying from the solutions list 176 a known error 178 that corresponds to the detected rendering error, the rendering manager 150 (e.g., using the machine learning model 168) obtains from the solutions list 176 a known solution that corresponds to the identified known error 178. As described above, a known solution 180 corresponding to a known error 178 may include a solution to the corresponding known error 178 that had previously resolved the known error 178. For example, the obtained known solution 180 corresponding to the identified known error 178 may include a revised source code 182 and/or revise instructions 184 to revise the source code 166 of the virtual-world application 164.

At operation 514, rendering manager 150 determines a portion of the source code 166 of the virtual-world application 164 that relates to the detected rendering error.

As described above, rendering manager 150 (e.g., using the machine learning model 168) may be configured to identify a portion of the source code 166 of the virtual-world application 164 that relates to the detected rendering error. For example, as described above, based on comparing a rendered view 112 of the virtual environment 102 with a corresponding expected view pattern 170, rendering manager 150 may determine that the detected rendering error occurred in relation to rendering a particular expected visual element 172. Rendering manager 150 may be configured to identify a portion of the source code 166 that corresponds to (e.g., is responsible to render) the particular expected visual element 172. In another example, based on comparing actual metadata 188 relating to one or more frames 122 of a video clip 120 rendered in the virtual environment 102 to expected metadata 189 or expected transitions 190 relating to the one or more frames 122, rendering manager 150 may determine that the detected rendering error occurred in relation to rendering a particular frame 122 of the video clip 120. Rendering manager 150 may be configured to identify a portion of the source code 166 that corresponds to (e.g., is responsible to render) the particular frame 122 of the video clip 120.

At operation 516, rendering manager 150 revises the portion of the source code 166 in accordance with the revised source code 182 or revise instructions 184 specified in the known solution 180 to revise the source code 166. As described above, once the portion of the source code 166 that corresponds to the detected rendering error is identified, the rendering manager 150 (e.g., using the machine learning model 168) may be configured to resolve the detected rendering error by revising the identified portion of the source code 166 based on the revised source code 182 and/or revise instructions 184 obtained from the solutions list 176. For example, revising the identified portion of the source code 166 includes replacing the identified portion of the source code 166 with the revised source code 182.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system comprising: a memory that stores a plurality of expected view patterns, wherein each expected view pattern relates to a view of a virtual environment and comprises an expected pattern of one or more visual elements included in the view; and at least one processor coupled to the memory, and configured to: run a software application on a simulated user device to render the virtual environment on the simulated user device, wherein the simulated user device is a computer simulation of a real-world user device configured to run the software application; detect that a first view of the virtual environment has been rendered by the software application on the simulated user device; access from the memory a first expected view pattern of the plurality of expected view patterns, wherein the first expected view pattern corresponds to the first view; compare the first view of the virtual environment to the first expected view pattern; detect, based on the comparison, that a pattern of one or more visual elements in the first view does not match with the expected pattern of visual elements in the first expected view pattern; in response to detecting that the pattern does not match with the expected pattern, determine that an error has occurred relating to generating the first view of the virtual environment by the software application on the simulated user device; obtain a solution corresponding to the error; and apply the solution to the software application to resolve the determined error.

2. The system of claim 1, wherein the at least one processor is further configured to:
 determine, based on the comparison of the first view of the virtual environment to the first expected view pattern, that a particular visual element rendered in the first view does not match with a corresponding expected visual element in the first expected view pattern; and
 in response to determining that the particular visual element does not match with the expected visual element, determine that an error occurred in rendering the particular visual element.

3. The system of claim 2, wherein the processor is further configured to:
 in response to determining that the error has occurred relating to the generation of the first view of the virtual environment, generate a notification indicating that the error has occurred, wherein the notification comprises an identification of the particular visual element;
 transmit the notification;
 in response to transmitting the notification, receive a solution to the error; and
 apply the solution to the software application to resolve the error in rendering the particular visual element.

4. The system of claim 1, wherein the error relating to the generation of the first view comprises at least one of a misaligned visual element, an unloaded visual element, a partially loaded visual element and an erroneous layout of one or more visual elements in the first view.

5. The system of claim 1, wherein the at least one processor is further configured to:
 train a machine learning model based on the plurality of expected view patterns to identify an expected pattern of visual elements in a respective view of the virtual environment generated by the software application;

compare the expected pattern with the respective view using the trained machine learning model;

determine, using the trained machine learning model, that a pattern of the one or more visual elements in the respective view does not match with the expected pattern; and in response, determine using the trained machine learning model that an error has occurred in relation to generation of the respective view of the virtual environment.

6. The system of claim 1, wherein the at least one processor is further configured to: search a list of solutions based on the determined error, wherein each solution in the list of solutions corresponds to a known error associated with generation of the virtual environment on the real-world user device; obtain, based on the search, a solution corresponding to the determined error; and apply the solution to the software application to resolve the determined error.

7. The system of claim 6, wherein:
the solution comprises a revised source code or instructions to revise a source code of the software application to resolve a respective error;
the at least one processor is configured to apply the solution to the software application by:
determining a portion of the source code of the software application that relates to the detected error; and
revising the portion of the source code in accordance with the revised source code or instructions to revise the source code specified in the solution.

8. The system of claim 6, wherein the at least one processor is further configured to:
detect a second error has occurred associated with the generation of the virtual environment by the software application on the simulated user device;
determine that a solution corresponding to the second error does not exist in the list of solutions;
store information relating to the second error in the memory;
generate an error notification relating to the error, wherein the error notification comprises the information relating to the second error;
transmit the error notification;
in response to transmitting the error notification, receive a solution to the second error; and
apply the solution to the software application to resolve the second error.

9. A method for resolving errors in generating a virtual environment, comprising: running a software application on a simulated user device to render the virtual environment on the simulated user device, wherein the simulated user device is a computer simulation of a real-world user device configured to run the software application; detecting that a first view of the virtual environment has been rendered by the software application on the simulated user device; accessing from the memory a first expected view pattern of a plurality of expected view patterns, wherein the first expected view pattern corresponds to the first view, wherein each expected view pattern relates to a view of the virtual environment and comprises an expected pattern of one or more visual elements included in the view; comparing the first view of the virtual environment to the first expected view pattern; detecting, based on the comparison, that a pattern of one or more visual elements in the first view does not match with the expected pattern of visual elements in the first expected view pattern; in response to detecting that the pattern does not match with the expected pattern, determining that an error has occurred relating to generating the first view of the virtual environment by the software application on the simulated user device; obtaining a solution corresponding to the error; and applying the solution to the software application to resolve the determined error.

10. The method of claim 9, further comprising:
determining, based on the comparison of the first view of the virtual environment to the first expected view pattern, that a particular visual element rendered in the first view does not match with a corresponding expected visual element in the first expected view pattern; and
in response to determining that the particular visual element does not match with the expected visual element, determining that an error occurred in rendering the particular visual element.

11. The method of claim 10, further comprising:
in response to determining that the error has occurred relating to the generation of the first view of the virtual environment, generating a notification indicating that the error has occurred, wherein the notification comprises an identification of the particular visual element;
transmitting the notification;
in response to transmitting the notification, receiving a solution to the error; and
applying the solution to the software application to resolve the error in rendering the particular visual element.

12. The method of claim 9, wherein the error relating to the generation of the first view comprises at least one of a misaligned visual element, an unloaded visual element, a partially loaded visual element and an erroneous layout of one or more visual elements in the first view.

13. The method of claim 9, further comprising:
training a machine learning model based on the plurality of expected view patterns to identify an expected pattern of visual elements in a respective view of the virtual environment generated by the software application;
comparing the expected pattern with the respective view using the trained machine learning model;
determining, using the trained machine learning model, that a pattern of the one or more visual elements in the respective view does not match with the expected pattern; and
in response, determining using the trained machine learning model that an error has occurred in relation to generation of the respective view of the virtual environment.

14. The method of claim 9, further comprising: searching a list of solutions based on the determined error, wherein each solution in the list of solutions corresponds to a known error associated with generation of the virtual environment on the real-world user device; obtaining, based on the search, a solution corresponding to the determined error; and applying the solution to the software application to resolve the determined error.

15. The method of claim 14, wherein:
the solution comprises a revised source code or instructions to revise a source code of the software application to resolve a respective error;
wherein applying the solution to the software application comprises:
determining a portion of the source code of the software application that relates to the detected error; and revising the portion of the source code in accordance with the revised source code or instructions to revise the source code specified in the solution.

16. The method of claim 14, further comprising:
detecting a second error has occurred associated with the generation of the virtual environment by the software application on the simulated user device;
determining that a solution corresponding to the second error does not exist in the list of solutions;
storing information relating to the second error in the memory;
generating an error notification relating to the error, wherein the error notification comprises the information relating to the second error;
transmitting the error notification;
in response to transmitting the error notification, receiving a solution to the second error; and
applying the solution to the software application to resolve the second error.

17. A non-transitory computer-readable medium for resolving errors in generating a virtual environment, wherein the non-transitory computer-readable medium stores instructions that when executed by a processor cause the processor to: run a software application on a simulated user device to render the virtual environment on the simulated user device, wherein the simulated user device is a computer simulation of a real-world user device configured to run the software application; detect that a first view of the virtual environment has been rendered by the software application on the simulated user device; access from memory a first expected view pattern of a plurality of expected view patterns, wherein the first expected view pattern corresponds to the first view, wherein each expected view pattern relates to a view of the virtual environment and comprises an expected pattern of one or more visual elements included in the view; compare the first view of the virtual environment to the first expected view pattern; detect, based on the comparison, that a pattern of one or more visual elements in the first view does not match with the expected pattern of visual elements in the first expected view pattern; in response to detecting that the pattern does not match with the expected pattern, determine that an error has occurred relating to generating the first view of the virtual environment by the software application on the simulated user device; obtain a solution corresponding to the error; and apply the solution to the software application to resolve the determined error.

18. The non-transitory computer-readable medium of claim 17, wherein the instructions further cause the processor to:
determine, based on the comparison of the first view of the virtual environment to the first expected view pattern, that a particular visual element rendered in the first view does not match with a corresponding expected visual element in the first expected view pattern; and
in response to determining that the particular visual element does not match with the expected visual element, determine that an error occurred in rendering the particular visual element.

19. The non-transitory computer-readable medium of claim 18, wherein the instructions further cause the processor to:
in response to determining that the error has occurred relating to the generation of the first view of the virtual environment, generate a notification indicating that the error has occurred, wherein the notification comprises an identification of the particular visual element;
transmit the notification;
in response to transmitting the notification, receive a solution to the error; and
apply the solution to the software application to resolve the error in rendering the particular visual element.

20. The non-transitory computer-readable medium of claim 17, wherein the error relating to the generation of the first view comprises at least one of a misaligned visual element, an unloaded visual element, a partially loaded visual element and an erroneous layout of one or more visual elements in the first view.

* * * * *